(12) United States Patent
Ando

(10) Patent No.: US 9,235,453 B2
(45) Date of Patent: Jan. 12, 2016

(54) INFORMATION PROCESSING SYSTEM, INFORMATION PROCESSING APPARATUS, AND INFORMATION PROCESSING METHOD

(75) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 627 days.

(21) Appl. No.: 13/604,925

(22) Filed: Sep. 6, 2012

(65) Prior Publication Data
US 2013/0073719 A1 Mar. 21, 2013

(30) Foreign Application Priority Data

Sep. 16, 2011 (JP) .................................. 2011-203790
Feb. 10, 2012 (JP) .................................. 2012-026875

(51) Int. Cl.
*G06F 15/16* (2006.01)
*G06F 15/173* (2006.01)
*G06F 9/54* (2006.01)

(52) U.S. Cl.
CPC ..................................... *G06F 9/542* (2013.01)

(58) Field of Classification Search
CPC . H04L 63/1416; H04L 12/2602; H04L 41/22; G06F 21/552; G06F 9/542; G06F 21/554
See application file for complete search history.

(56) References Cited

U.S. PATENT DOCUMENTS

| 7,812,978 | B2 | 10/2010 | Ando et al. | |
| 8,065,384 | B2 | 11/2011 | Plewnia et al. | |
| 2002/0184113 | A1 | 12/2002 | Ono et al. | |
| 2006/0070087 | A1* | 3/2006 | Ando et al. | ...................... 719/320 |
| 2006/0077448 | A1* | 4/2006 | Plewnia et al. | .............. 358/1.15 |
| 2008/0010491 | A1 | 1/2008 | Kita | |
| 2010/0088408 | A1 | 4/2010 | Asai et al. | |
| 2011/0167151 | A1* | 7/2011 | Nishiyama | ...................... 709/224 |
| 2011/0214133 | A1* | 9/2011 | Lum et al. | ...................... 719/318 |

FOREIGN PATENT DOCUMENTS

| CN | 1388476 | 1/2003 |
| JP | 2006-079211 | 3/2006 |
| JP | 2006-109411 | 4/2006 |
| JP | 2007-102773 | 4/2007 |

(Continued)

OTHER PUBLICATIONS

Chinese Office Action dated Jan. 30, 2015.

(Continued)

*Primary Examiner* — Peling Shaw
(74) *Attorney, Agent, or Firm* — IPUSA, PLLC

(57) ABSTRACT

A disclosed information processing system includes a first apparatus including a storage unit storing types of events which occur in the first apparatus so as to be reported to an information processing apparatus via a network, and a sending unit sending, when one of the events stored in the storage unit occurs, event information of the event to the information processing apparatus; and the information processing apparatus including a delivery destination storage unit storing identification information of a second apparatus existing at a delivery destination of the event in the first apparatus, and a delivery unit sending the event information of the event to the second apparatus of which identification information is stored in the delivery destination storage unit when the event information is received by the information processing apparatus.

12 Claims, 35 Drawing Sheets

(56) References Cited

FOREIGN PATENT DOCUMENTS

| | | |
|---|---|---|
| JP | 2007-208910 | 8/2007 |
| JP | 2007-334741 | 12/2007 |
| JP | 2010-114881 | 5/2010 |

OTHER PUBLICATIONS

Japanese Office Action dated Oct. 13, 2015.

\* cited by examiner

FIG.6

| SERVICE NAME | SERVICE CONTENT | SUBSCRIPTION EVENT LIST | CALLBACK URL | USE SETUP URL | ... |
|---|---|---|---|---|---|
| fax2email | ... | RECEIVING FAX | ... | ... | |
| | | | | | |
| | | | | | |

| USER NAME | PASSWORD | ADMINISTRATOR NAME | |
|---|---|---|---|
| A | ⋮ | A | ⋮ |
| B | ⋮ | A | ⋮ |
| C | ⋮ | A | ⋮ |
| D | ⋮ | A | ⋮ |
| ‥ | ‥ | ‥ | ‥ |

```
<HTML>
<HEAD>
<TITLE>ADMINISTRATOR PORTAL SCREEN</TITLE>
<SCRIPT TYPE="text/javascript" SRC="deviceHook.js">  ~d1
..
function setDeviceHook(){
DeviceHook.setFaxRx(・・・);   ~d21
alert("FAX RECEIPT IS REGISTERED AS REPORT OBJECT")  ~d22
}
</SCRIPT>
</HEAD>
<BODY>
<INPUT TYPE="button" VALUE="FaxRx" onClick="setFaxRx()">  ~d3
::
</BODY>
</HTML>
```

| APPARATUS NUMBER | SUBSCRIPTION SERVICE NAME | USER NAME | APPARATUS ATTRIBUTE INFORMATION |
|---|---|---|---|
| xxxxxxx | fax2email | A, B | ... |
| | | | |
| | | | |

| APPARATUS NUMBER | APPARATUS NAME | INSTALLATION LOCATION | IP ADDRESS | ADMINISTRATOR NAME |
|---|---|---|---|---|
| 12345 | AAA | FUKUOKA 2ND FLOOR | xxxxx | A |
| 11111 | BBB | EBINA BUILDING | FW | A |
| 67890 | CCC | OHMORI BUILDING 2ND FLOOR | yyyyy | A |
| .. | .. | .. | .. | .. |

FIG.30

APPARATUS REGISTRATION SCREEN — 560

| APPARATUS NUMBER | APPARATUS NAME | INSTALLATION LOCATION | IP ADDRESS |
|---|---|---|---|
| 12345 | AAA | FUKUOKA 2ND FLOOR | xxxxx |
| 11111 | BBB | EBINA BUILDING | FW |
| 67890 | CCC | OHMORI BUILDING 2ND FLOOR | yyyyy |

561

ADD — 562

REGISTER — 563

CANCEL

FIG.31

| APPARATUS ADDITION SCREEN | |
|---|---|
| APPARATUS NUMBER | |
| APPARATUS NAME | |
| INSTALLATION LOCATION | |
| IP ADDRESS | |

OK   CANCEL

FIG.34

COLLABORATION APPARATUS SELECTION SCREEN — 580

581

| APPARATUS NUMBER | APPARATUS NAME | INSTALLATION LOCATION |
|---|---|---|
| ■ 12345 | AAA | FUKUOKA 2ND FLOOR |
| ☐ 11111 | BBB | EBINA BUILDING |
| ■ 67890 | CCC | OHMORI BUILDING 2ND FLOOR |
| ... | | |

OK — 582

INFORMATION PROCESSING SYSTEM, INFORMATION PROCESSING APPARATUS, AND INFORMATION PROCESSING METHOD

BACKGROUND OF THE INVENTION

1. Field of the Invention

The present invention generally relates to to an information processing system, an information processing apparatus, and an information processing method.

2. Description of the Related Art

For example, Patent Document 1 discloses an image forming apparatus which can achieve function enhancement by installing an application program.

Meanwhile, in recent years, cloud computing service attracts attention. If the functions of application programs for an image forming apparatus are served by cloud computing services such as a Web application or a server application, users can enjoy added value.

Patent Document 1: Japanese Laid-Open Patent Application No. 2006-079211

SUMMARY OF THE INVENTION

Accordingly, embodiments of the present invention provide a novel and useful information processing system, an information processing apparatus, and an information processing method solving one or more of the problems discussed above.

One aspect of the embodiments of the present invention may be to provide an information processing system including a first apparatus including a storage unit configured to store types of events which occur in the first apparatus and determined to be reported to an information processing apparatus connected to the first apparatus via a network, and a sending unit configured to send, when one of the events stored in the storage unit occurs, event information of the one of the events to the information processing apparatus; and the information processing apparatus including a delivery destination storage unit configured to store identification information of a second apparatus existing at a delivery destination of the one of the events occurring in the first apparatus, and a delivery unit configured to send the event information of the one of the events to the second apparatus of which identification information is stored in the delivery destination storage unit when the event information is received by the information processing apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrates an exemplary structure of a subscription information memory unit;

FIG. 10 illustrates an exemplary structure of a user information memory unit;

FIG. 16 illustrates a part of exemplary HTML data defining an administrator portal screen;

FIG. 18 illustrates an exemplary structure of a collaboration information memory unit;

FIG. 29 illustrates an exemplary structure of an apparatus information memory unit;

FIG. 30 is an exemplary display of an apparatus registration screen;

FIG. 31 is an exemplary display of an apparatus addition screen;

FIG. 34 is an exemplary display on a collaboration apparatus selection screen.

DETAILED DESCRIPTION OF THE PREFERRED EMBODIMENTS

An application program for an image forming apparatus may be started to run upon various events occurring in the image forming apparatus or may be modified to change contents of processes by the application program depending on the events. However, it is difficult to detect the occurrences of the events from a server located outside the image forming apparatus and connected to a network (both in an inside and an outside of a company).

Such a difficulty commonly occurs in detecting the occurrences of events in various apparatuses which can have installed an application program from a server located outside the various apparatuses and connected to a network.

A description is given below, with reference to the FIG. 1 through FIG. 35 of embodiments of the present invention. Where the same reference symbols are attached to the same parts, repeated description of the parts is omitted.

Reference symbols typically designate as follows:
1: information processing system;
10: image forming apparatus;
11: controller;
12: scanner;
13: printer;
14: modem;
15: operations panel;
16: network interface;
17: SD card slot
20: event delivery apparatus;
21: portal unit;
22: collaboration setup unit;
23: delivery unit;
24: user information memory unit;
25: subscription information memory unit;
26: collaboration information memory unit;
27: apparatus setup unit;
28: apparatus information memory unit;
30: service providing apparatus;
31: service providing unit;
32: setup information memory unit;
40: user terminal;
41: Web browser unit;
50: fax apparatus;
51: terminal browser unit;
80: SD card;
111: CPU;
112: RAM;
113: ROM;
114: HDD;
115: NVRAM;
121: apparatus browser unit;
122: event reporting unit;
123: system control unit;
124: report object memory unit;
125: registration processing unit;
200: drive device;
201: recording medium;
202: auxiliary memory device;
203: memory device;
204: CPU;
205: interface device; and
B: bus.

Figure 1:
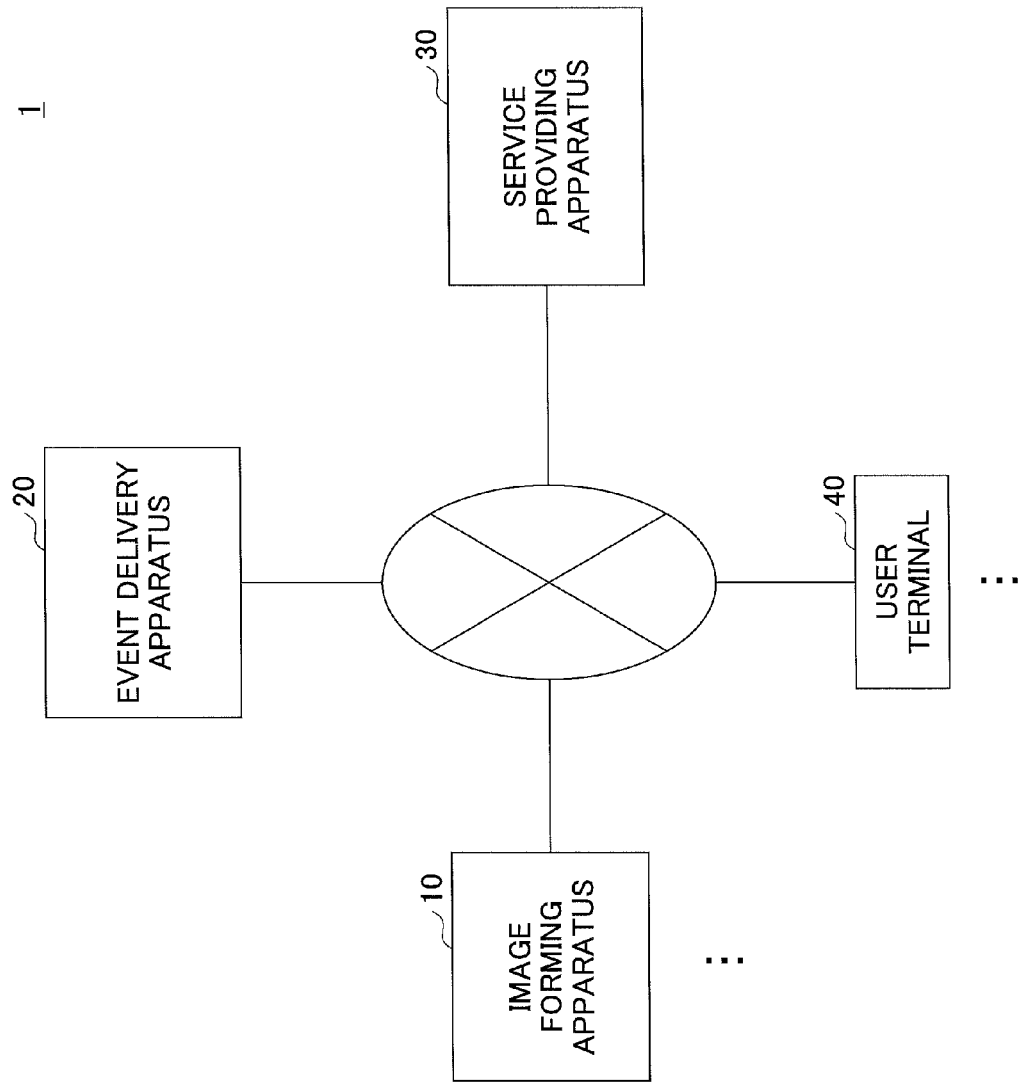
FIG. 1 illustrates an exemplary structure of an information processing system of an embodiment 1.

FIG. 1 illustrates an exemplary structure of an information processing system of an embodiment 1. In the information processing system 1, one or more image forming apparatuses 10, an event delivery apparatus 20, a service providing apparatus 30 and one or more user terminals 40 can communicate via a communication network such as a Local Area Network (LAN), an intranet, or the Internet.

The image forming apparatus 10 is a multifunction peripheral which can realize two or more functions among printing, scanning, copying, and a fax transmission with one casing. However, the image forming apparatus 10 may have one function among printing, scanning, copying, and the fax transmission. Within the embodiments, the image forming apparatus 10 has at least the function of fax transmission.

The event delivery apparatus 20 may be a computer for providing service of delivering various events occurring in the image forming apparatus 10 to delivery destinations (subscribers), which are previously registered. For example, the event delivery apparatus 20 provides event delivery service as a cloud computing service on the Internet. A user requesting delivery of events registers the delivery destination of the events in the event delivery apparatus 20. Within the embodiments, receipt of an event is referred to as "event subscription". Further, a delivery of information related to the event is referred to as "event delivery".

The service providing apparatus 30 is a computer for providing service based on an event delivered by the event delivery service. The service providing apparatus 30 is registered as an event subscriber in the event delivery apparatus 20. Within the embodiment, the service providing apparatus 30 may provide a service of transmitting a mail reporting a fax receipt to a mail address previously registered in response to the fax receipt (hereinafter, referred to as "fax receipt report service") as a cloud computing service. Within the embodiment, the service provided based on the event subscription is referred to as "subscription service". The fax receipt report service is an example of the subscription service.

The user terminal 40 is a computer used for receiving a mail reporting a fax receipt by a user who uses the fax receipt report service provided by the service providing apparatus 30. An example of the user terminal 40 is a desktop personal computer (PC), a notebook personal computer, a personal digital assistant (PDA), a tablet-type terminal, a smart phone, a mobile phone, or the like.

Figure 2:
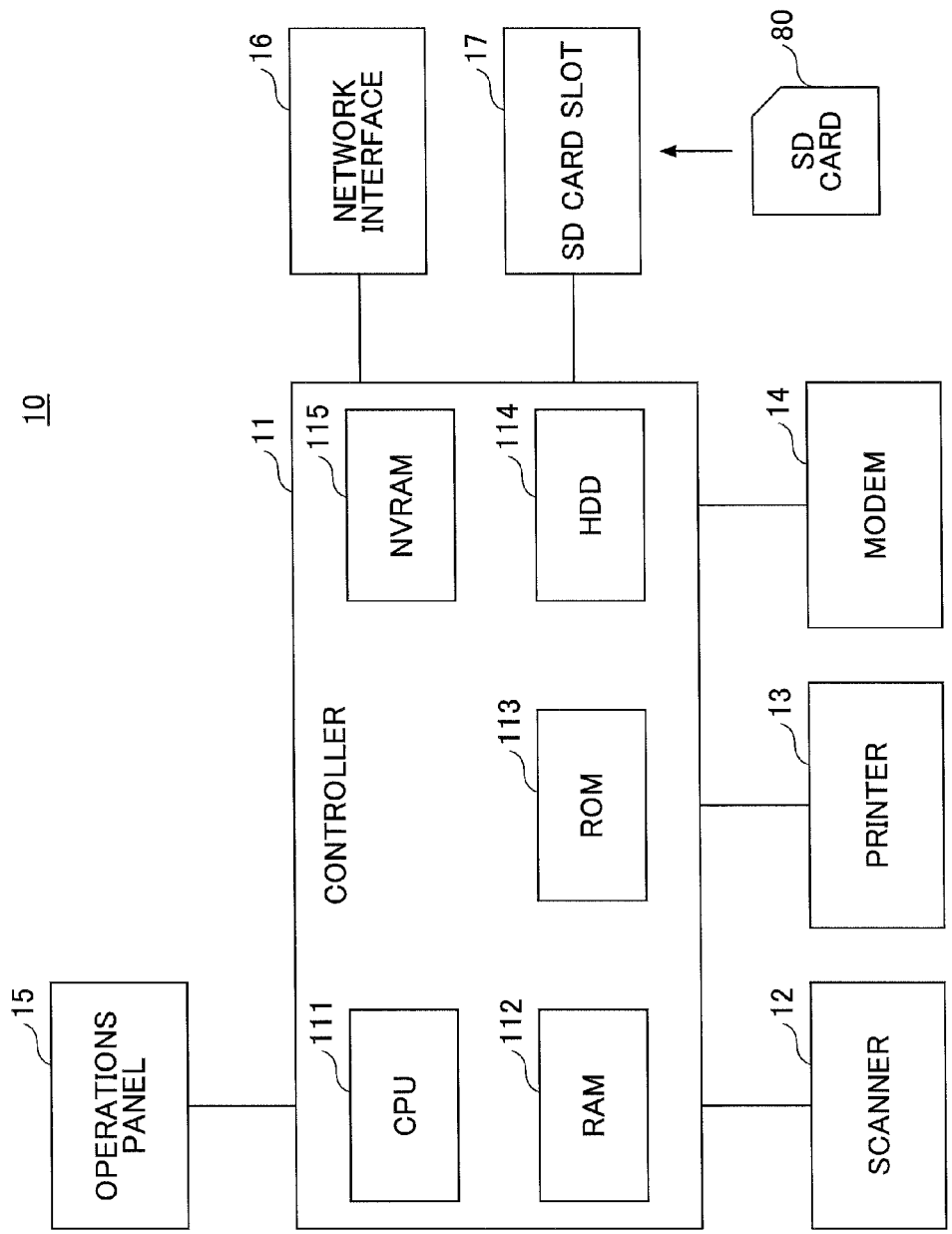
FIG. 2 illustrates an exemplary hardware structure of an image forming apparatus of an embodiment of the present invention.

FIG. 2 illustrates an exemplary hardware structure of the image forming apparatus 10 of the embodiment. Referring to FIG. 2, the image forming apparatus 10 includes hardware such as a controller 11, a scanner 12, a printer 13, a modem 14, an operations panel 15, a network interface 16, and an SD card slot 17.

The controller 11 includes a CPU 111, a RAM 112, a ROM 113, an HDD 114, an NVRAM 115 and so on. Various programs and data are stored in the ROM 113. The RAM 112 is used as a memory area for loading the programs, a work area for the loaded programs, or the like. The CPU 111 demonstrates various functions by processing the programs loaded into the RAM 112. The HDD 114 records programs, various data used by the programs, or the like. The NVRAM 115 stores various setup information or the like.

The scanner 12 is hardware for reading image data from an original (an original manuscript). The printer 13 is hardware for printing print data on a print paper. The modem 14 is hardware for connecting the image forming apparatus 10 to a telecommunication line (not illustrated) and is used for sending and receiving the image data with fax communications.

The operations panel 15 is hardware provided with an input unit for receiving an input from the user such as a button and a display unit such as a liquid crystal panel. The network interface 16 is hardware for connecting the image forming apparatus 10 to a wired or wireless network such as a LAN. The SD card slot 17 is used to read a program recorded in the SD card 80. Said differently, not only the programs stored in the ROM 113 but also the programs stored in the SD card 80 may be loaded into the RAM 112 and executed by the image forming apparatus 10. The SD card 80 may be replaced by another recording medium such as a CD-ROM and a universal serial bus (USB) memory. The recording medium is not specifically limited and may be any memory. In this case, the SD card slot 17 may be replaced by hardware depending on kinds of the recording media.

Figure 3:
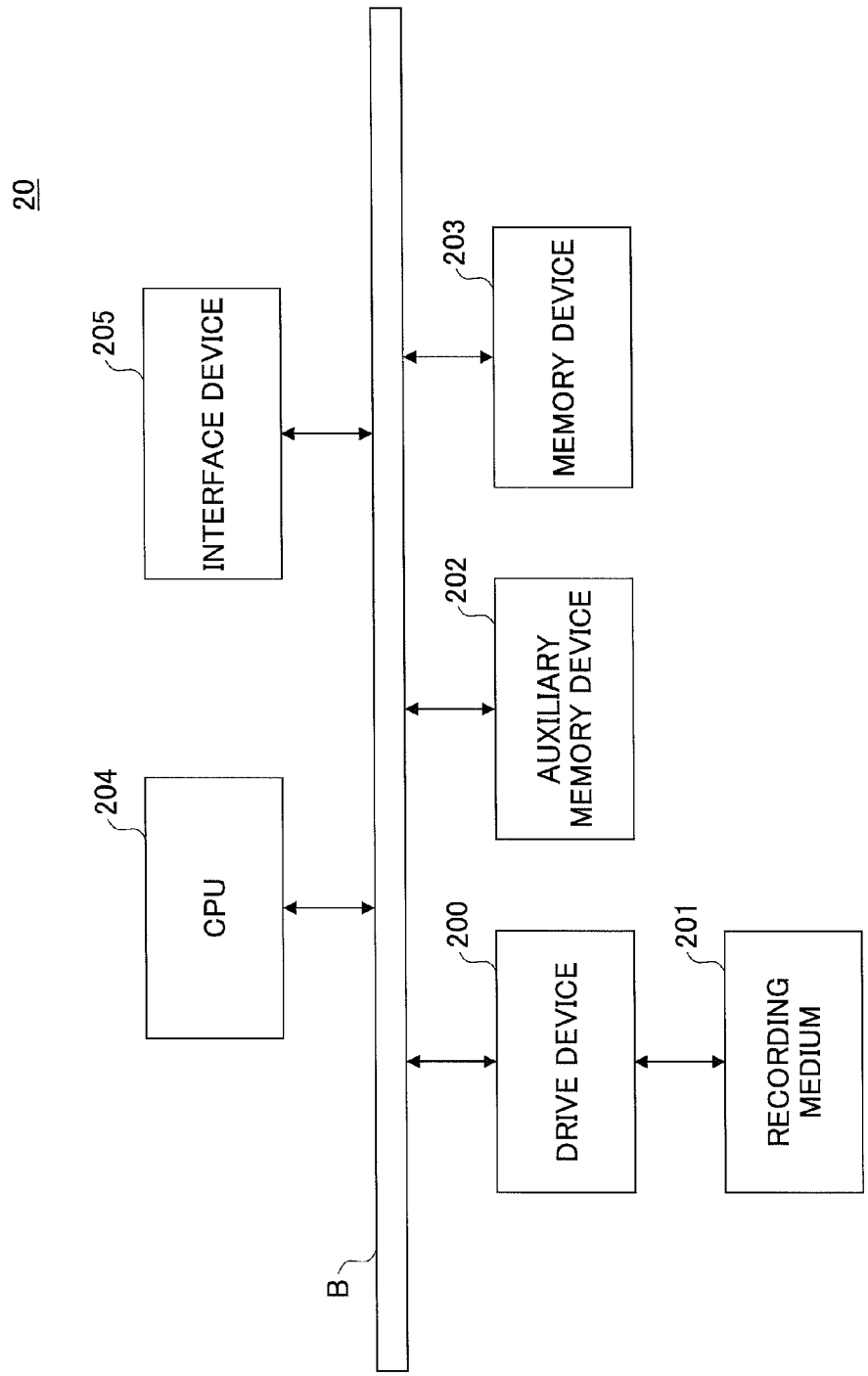
FIG. 3 illustrates an exemplary hardware structure of an event delivery apparatus of the embodiment of the present invention.

FIG. 3 illustrates an exemplary hardware structure of the event delivery apparatus 20 of the embodiment of the present invention. The event delivery apparatus 20 includes a drive device 200, an auxiliary memory device 202, a memory device 203, a CPU 204 and an interface device 205 which are mutually connected.

A program realizing processes in the event delivery server 20 is supplied by a recording medium 201 such as CD-ROM. When the recording medium 201 with the program recorded on it is installed in the drive device 200, the program is installed in the auxiliary memory device 201 via the drive device 200 from the recording medium 202. However, the program may not be always installed from the recording medium 201 and may be downloaded from another computer via the network. The auxiliary memory device 202 stores necessary files, data and so on in addition to the installed program.

The memory device 203 reads out the program from the auxiliary memory device 202 when the program is instructed to be invoked and stores the read program in the memory device 103. The CPU 204 realizes a function related to the event delivery apparatus 20 in conformity with the program stored in the memory device 203. The interface device 205 is used as an interface for connecting to the network.

The service providing apparatus 30 may have the hardware illustrated in FIG. 3.

Figure 4:
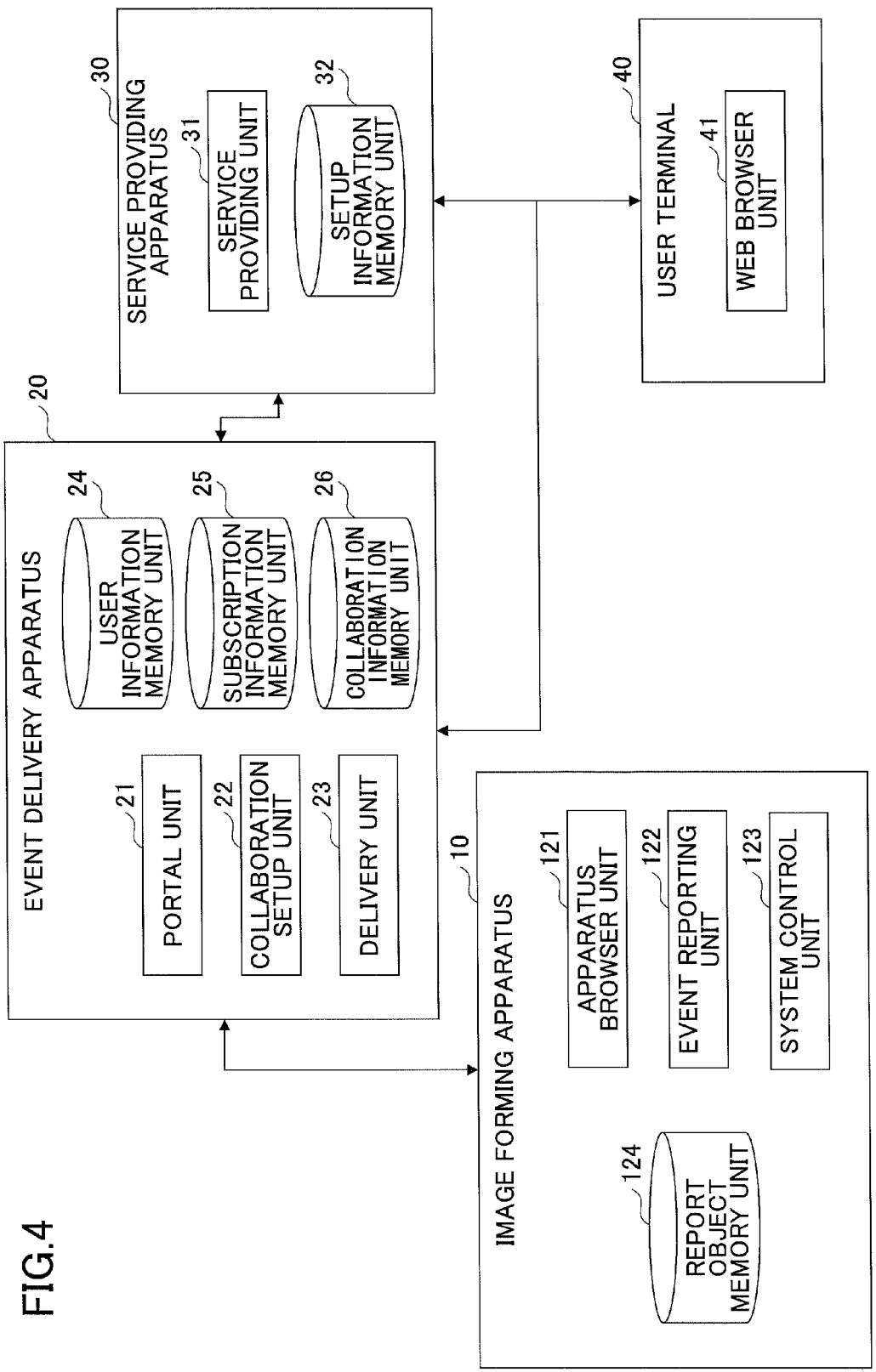
FIG. 4 illustrating an exemplary structure of the information processing system of the embodiment 1.

FIG. 4 illustrates an exemplary structure of the information processing system of the embodiment 1.

Referring to FIG. 4, the image forming apparatus 10 includes an apparatus browser unit 121, an event reporting unit 122, a system control unit 123 and so on. These units are realized when the program installed in the image forming apparatus 10 is executed by the CPU 111. The image forming apparatus 10 includes a report object memory unit 124. The report object memory unit 124 may be realized by the HDD 114 or the like.

The apparatus browser unit 121 causes the operations panel 15 to display a browser screen. The apparatus browser unit 121 realizes a function similar to that of an ordinary Web browser via the browser screen. For example, the apparatus browser unit 122 sends a HyperText Transfer Protocol (HTTP) request to a URL input in the browser screen. The apparatus browser unit 121 displays a screen on a display area of the browser screen based on HyperText Markup Language (HTML) data contained in an HTTP response returned in response to the HTTP request as exemplary display data. Further, the apparatus browser unit 121 can cause the image forming apparatus 10 to perform a process based on a script enhanced for the image forming apparatus 10 and being peculiar to the image forming apparatus 10. For example, the apparatus browser unit 121 causes the image forming apparatus 10 to scan using the scanner 12 based on the script indicative of an executive instruction for scanning. In the embodiment, the apparatus browser unit 121 sets an event type of the report object for the event delivery apparatus 20 in the event reporting unit 122 based on the script included in the HTML data indicative of the registration command for registering the event.

The event reporting unit 122 sends information related to the event to the event delivery apparatus 20 in response to the occurrence of the event as the report object in the image forming apparatus 10.

The system control unit 123 is a software group for controlling various hardware devices of the image forming apparatus 10.

The report object memory unit 124 stores an event type list to be the report object to be reported to the event delivery apparatus 20.

The event delivery apparatus 20 includes a portal unit 21, a collaboration setup unit 22, a delivery unit 23, and so on. These units are realized when the program installed in the image forming apparatus 20 is executed by the CPU 204. The event delivery apparatus 20 includes a user information memory unit 24, a subscription information memory unit 25, a collaboration information memory unit 26 and so on. The user information memory unit 24, the subscription information memory unit 25, and the collaboration information memory unit 26 can be realized by using the auxiliary memory device 202 or a memory device connected to the event delivery apparatus 20 via a network.

The user information memory unit 24 stores information related to a registered user who uses the event delivery service. The subscription information memory unit 25 stores information related to the subscription service. The collaboration information memory unit stores information necessary for collaboration between the image forming apparatus 10 and subscription service provided by a service providing unit 31 described below.

The portal unit 21 functions as a portal (an interface) of the event delivery service. The collaboration setup unit 22 performs a setup process for causing the image forming apparatus 10 and the subscription service provided by the service providing apparatus 30 to collaborate (for associating the image forming apparatus 10 and the subscription service provided by the service providing apparatus 30). For example, the collaboration setup unit 22 controls the setup process of determining one of the plural subscription services corresponding to one of the events occurring in the image forming apparatuses 10. A result of the setup process performed by the collaboration setup unit 22 is stored in the collaboration information memory unit 26.

The delivery unit 23 receives the information related to the events from the event reporting unit 122 of the image forming apparatus 10 and delivers the information to the delivery destinations stored in the collaboration information memory unit 26.

The service providing apparatus 30 includes a service providing unit 31, a setup information memory unit 32, and so on. The service providing unit 31 performs a process for providing the fax receipt report service. When another subscription service is provided, another service providing unit 31 may be added to provide the other subscription service. The setup information memory unit 32 stores setup information related to the fax receipt report service, i.e., setup information used by the service providing unit 31. The service providing unit 31 is realized when a program installed on the service providing apparatus 30 is executed by a CPU of the service providing apparatus. Further, the setup information memory unit 32 is realized by an auxiliary memory device of the service providing apparatus 30 or a memory device connected to the service providing apparatus 30 via the network.

The user terminal 40 includes a Web browser unit 41. The Web browser unit 41 realizes a function similar to that of an ordinary Web browser.

Figure 5:
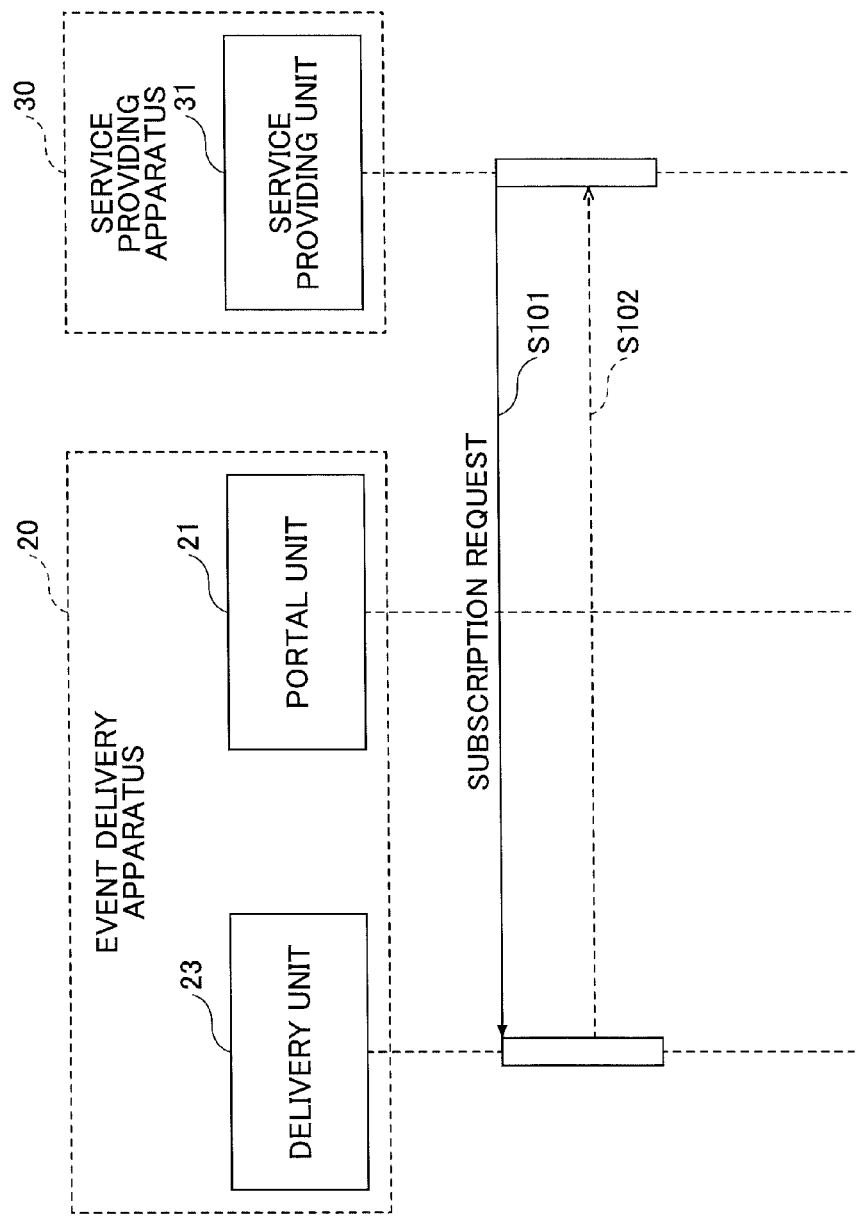
FIG. 5 is a sequence chart for explaining an exemplary registration process of subscription service.

Hereinafter, the procedures of the information processing system 1 are described. FIG. 5 is a sequence chart for explaining an exemplary registration process of subscription service.

In step S101, the service providing unit 31 of the service providing apparatus 30 sends a subscription request for event subscription to the event delivery apparatus 20. The subscription request is sent at a time when the program causing the service providing apparatus 30 to function as a service providing unit 31 is initially initiated. The subscription request includes a service name, a service content, a subscription event list, a callback Uniform Resource Locator (URL), a usage setup URL, and so on. The service name is an identification name (identification information) of the fax receipt report service provided by the service providing unit 31. The service content is a description indicative of a content of the fax receipt report service provided by the service providing unit 31. The subscription event list is a list of event types to subscribe to (deliver). In order to provide the fax receipt report service, subscription of a fax receipt event is necessary. Therefore, the fax receipt event is designated in the subscription event list. The callback URL represents an event delivery destination designated in the subscription event list. The callback URL may be designated for each event type designated in the subscription event list. One shared URL may be designated for all event types designated in the subscription event list. Within the embodiment, the latter case (the one shared URL for the all event types) is described. The usage setup URL is allocated for a setup screen for setting at a time of starting to use the fax receipt report service (hereinafter, referred to as a "usage setup screen").

When the subscription request is received by the event delivery apparatus 20, the delivery unit 23 stores (registers) information designated by the subscription request in the subscription information memory unit 25.

FIG. 6 illustrates an exemplary structure of the subscription information memory unit 25. Referring to FIG. 6, the subscription information memory unit 25 stores the service names, the service contents, the subscription event lists, the callback URLs, the usage setup URLs and so on for each event subscriber. In the items of the service names, the service contents, the subscription event lists, the callback URLs, the usage setup URLs and so on, values designated in the subscription requests are registered.

Subsequently, the delivery unit 23 returns a response indicative of normal registration in the subscription information memory unit 25 as the subscriber to the service providing unit 31 in step S102. Upon receipt of the response, the service providing unit 31 waits for an event delivery from the delivery unit 23.

Subsequently, a setup process for collaboration between the image forming apparatus 10 and the subscription service asynchronously carried out after the processes illustrated in FIG. 5 is described.

Figure 7:
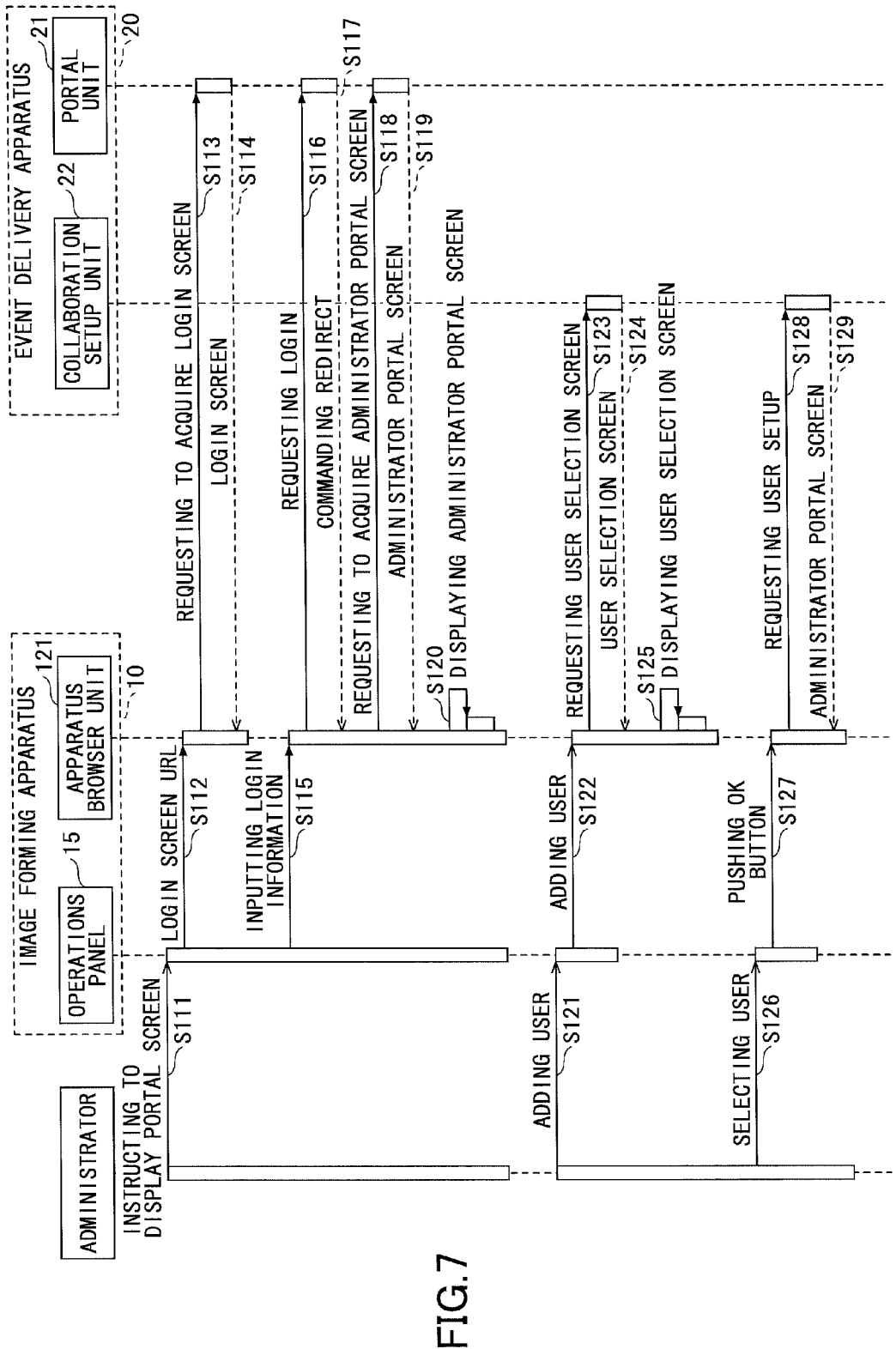
FIG. 7 is a sequence chart for explaining an exemplary setup process for collaboration between the image forming apparatus and the subscription service of the embodiment 1.
Figure 8:
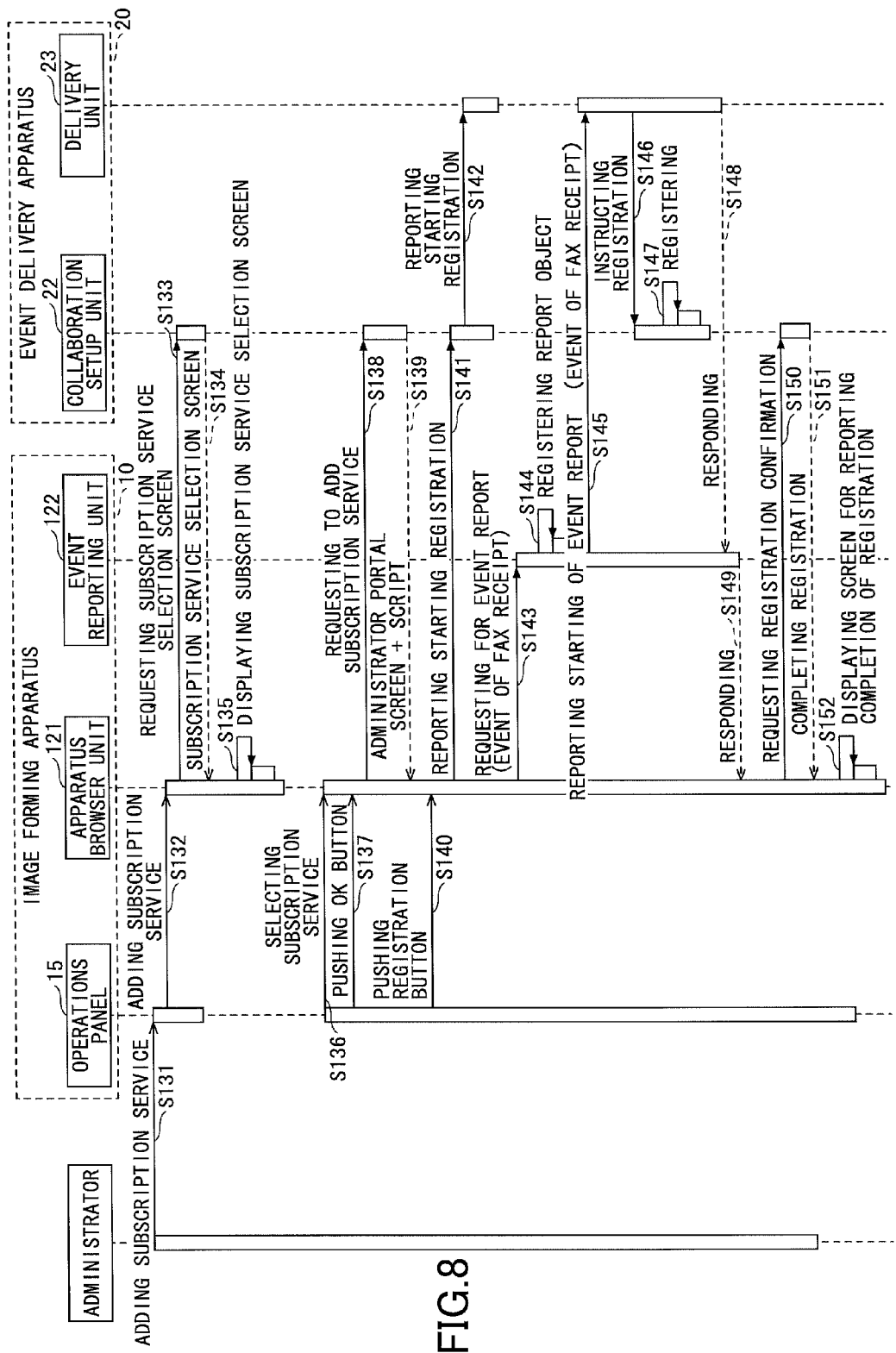
FIG. 8 is another sequence chart for explaining an exemplary setup process for collaboration between the image forming apparatus and the subscription service of the embodiment 1.

FIGS. 7 and 8 are sequence charts for explaining an exemplary setup process for collaboration between the image forming apparatus 10 and the subscription service of the embodiment 1.

For example, when an administrator of the image forming apparatus 10 instructs to display an administrator portal screen for an event delivery service via the operations panel 15 in step S111, the URL of a login screen of the event delivery service is input in the apparatus browser unit 121 in step S112. Subsequently, the apparatus browser unit 121 sends an HTTP request for requiring acquisition of the login screen to the URL in step S113. The portal unit 21 of the event delivery apparatus 20 sends an HTTP response including HTML data for displaying the login screen upon receipt of the HTTP request in step S114.

When the apparatus browser unit 121 receives the HTTP response, the apparatus browser unit 121 causes a login screen 510 to be displayed on the operations panel 15 based on the HTML data included in the HTTP response.

Figure 9:
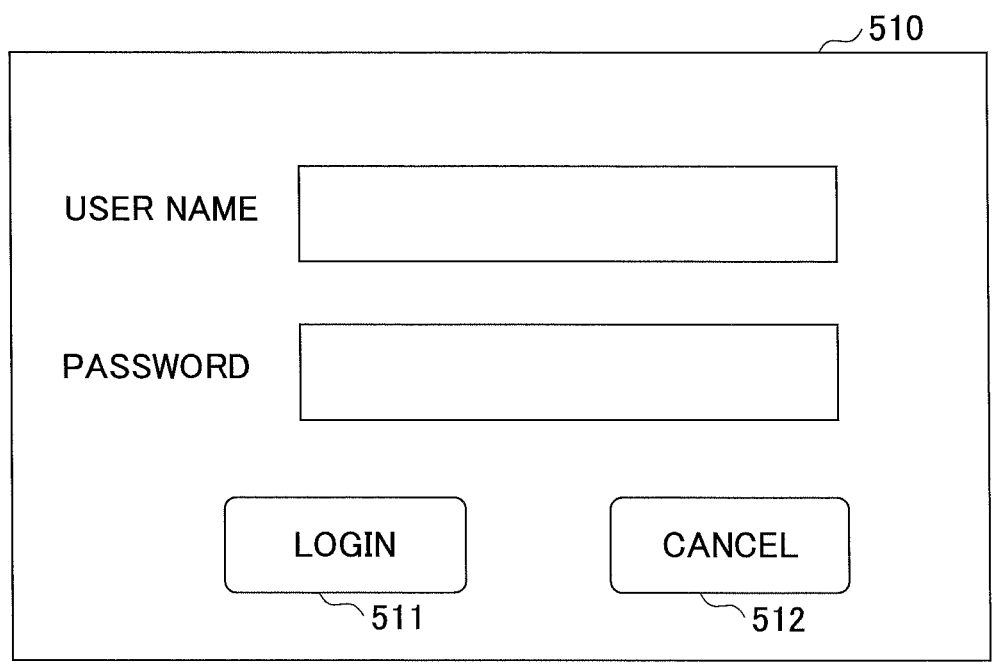
FIG. 9 is an exemplary display of a log-in screen.

FIG. 9 is an exemplary display of the login screen 510. Referring to FIG. 9, the login screen 510 includes areas for inputting a user name and a password, a login button 511 and a cancel button 512.

When login information such as the user name and the password is input in the login screen 510 and the login button 511 is pushed in step S115, the apparatus browser unit 121 sends a login request (an authentication request) as the administrator to the portal unit 21 of the event delivery apparatus 20 in step S116. The login request (the authentication request) includes the login information such as the login name and the password. The portal unit 21 refers to the user information memory unit 24 to authorize the user name and the password designated in the login request.

FIG. 10 illustrates an exemplary structure of the user information memory unit 24. Referring to FIG. 10, the user information memory unit 24 includes the user names, the passwords, the administrator names and so on for each user registered in the event delivery service. The administrator name may be the user name of the administrator. Referring to FIG. 10, the administrator of the image forming apparatus 10 has the user name A and also the administrator name A.

The portal unit 21 determines that the authorization as the administrator is successful when the user name and the password designated by the login request are stored in the user information memory unit 24, and the administrator name corresponding to the user name is the same as the user name.

When the authorization as the administrator is successful, the portal unit 21 returns a redirect command to the apparatus browser unit 121 in step S117. The redirect command includes a redirect destination which is a URL of an administrator portal screen for setting setup information related to collaboration (association) between the image forming apparatus 10 and the subscription service. For example, the redirect command includes a session ID generated in association with the user name of the login user who had successfully logged in. The session ID may be designated as a parameter at the time of the redirection.

When the apparatus browser unit 121 receives the redirect command, the apparatus browser unit 121 sends a request for acquiring the administrator portal screen to the URL of the redirection destination in step S118. The apparatus browser unit 121 stores the session ID included in the redirect command into, for example, the RAM 112 or the HDD 114. This session ID is designated when the apparatus browser unit 121 makes the request in or after step S118. The portal unit 21 of the event delivery apparatus 20 returns a response including HTML data for displaying the administrator portal screen upon receipt of the request in step S119.

When the apparatus browser unit 121 receives the response, the apparatus browser unit 121 causes the administrator portal screen to be displayed on the operations panel 15 based on the HTML data included in the response in step S120.

Figure 11:
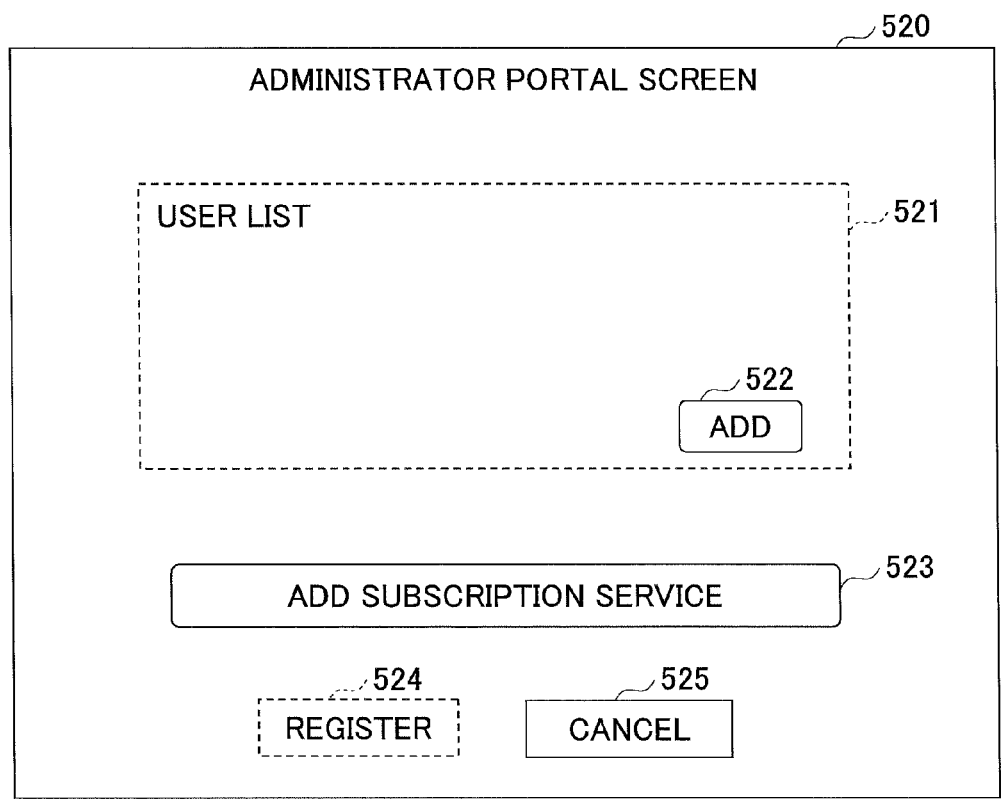
FIG. 11 is an exemplary display on an administrator portal screen.

FIG. 11 is an exemplary display on the administrator portal screen 520. Referring to FIG. 11, the administrator portal screen 520 includes a user list display area 521, an add button 522, a subscription service add button 523, a registration button 524, a cancel button 525 and so one.

The add button 522 is provided to receive an instruction of adding a user who is permitted to use the subscription service related to the event in the image forming apparatus 10. On the user list display area 521, a list of the user names who are permitted to use the subscription service related to the events of the image forming apparatus 10 is displayed.

The subscription service add button 523 is provided to receive the add instruction of adding the subscription service to an event delivery destination (a subscriber) of the events occurring in the image forming apparatus 10.

The registration button 524 is provided to receive the registration instruction of registering contents set in the administrator portal screen 520 in the event delivery apparatus 20. However, since the content to be registered is not yet registered at this time, the operation of the registration button 524 is disabled (displayed by a gray color). Referring to FIG. 11, the display by the gray color is expressed by a broken line. The cancel button 525 is provided to receive a cancel instruction of the registration operation via the administrator portal screen 520.

When the add button 522 is pushed by the administrator in step S121, the push of the add button 522 is reported the apparatus browser unit 121 in step S122. Subsequently, the apparatus browser unit 121 sends a request for acquiring a user selection screen to the collaboration setup unit 22 based on a definition associated with the add button 522 in the HTML data of the administrator portal screen 520 in step S123. The collaboration setup unit 22 generates HTML data for displaying the user selection screen upon receiving the request and returns a response including the generated HTML data in step S124. At this time, the collaboration setup unit 22 acquires the list of the user names of users who are registered in the "administrator name" from the user information memory unit 24. The user names are associated with the session IDs designated in the request from the apparatus browser unit 121. The collaboration setup unit 22 generates the HTML data using the list of the user names as an option.

When the apparatus browser unit 121 receives the response from the collaboration setup unit 22, the apparatus browser unit 121 causes the user selection screen to be displayed on the operations panel 15 based on the HTML data included in the response in step S125.

Figure 12:
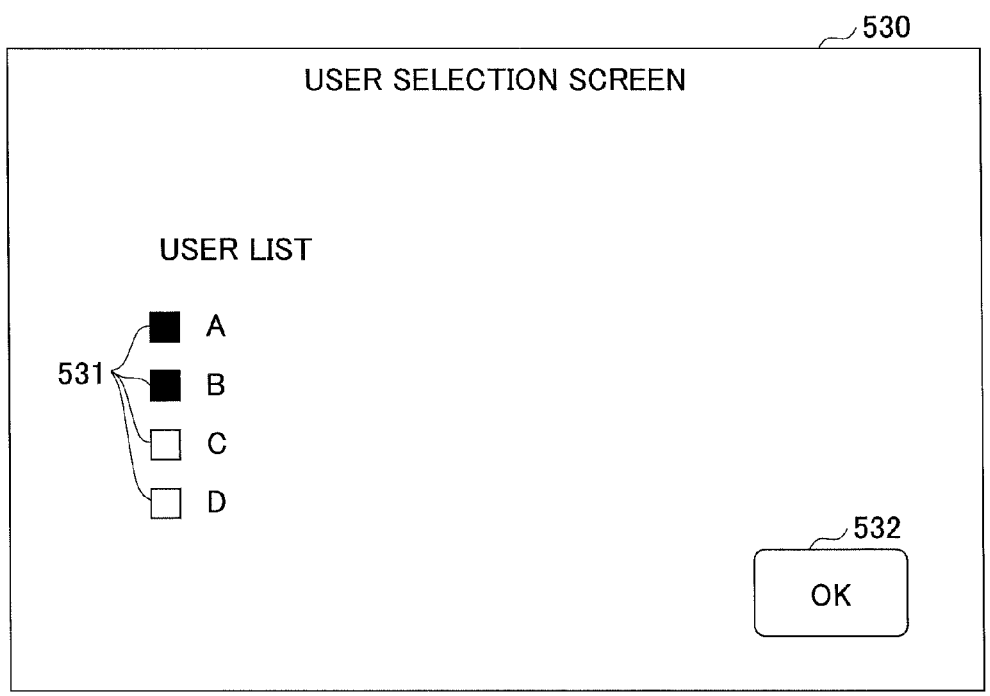
FIG. 12 is an exemplary display on a user selection screen.

FIG. 12 is an exemplary display of the user selection screen. Referring to FIG. 12, a user selection screen 530 includes check buttons 531 respectively for the user names A to D, and an OK button 532.

When the administrator selects the check box buttons 531 corresponding to the users permitted to use the subscription service for the events in the image forming apparatus 10 and further pushes the OK button 532 in step S126, these operations are reported to the apparatus browser unit 121 in step S127.

In response to the pushing of the OK button 532, the apparatus browser unit 121 sends the selected user names and a setup request including apparatus number to the collaboration setup unit 22 in step S128. Referring to FIG. 12 the users A and B are selected. In this case, the usernames of the users A and B are included on the setup request. The apparatus number is identification information for identifying the image forming apparatuses 10. For example, the identification information is stored in the ROM 113.

When the collaboration setup unit 22 has received the setup request, the collaboration setup unit 22 stores the apparatus number and the one or more users associated with the apparatus number in the memory device 203.

Next, the collaboration setup unit 22 generates HTML data for causing the display of the administrator portal screen 520 including the list of the user names stored in the memory device 203, and returns a response including the HTML data to the apparatus browser unit 121 in step S129.

Figure 13:
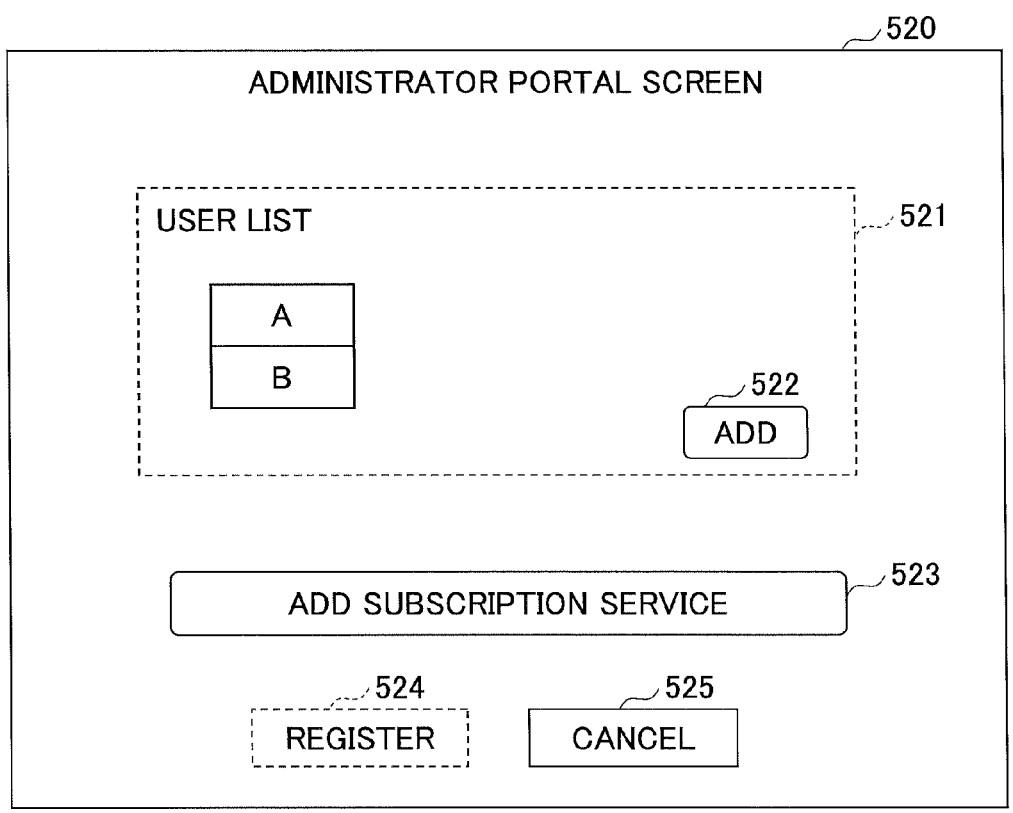
FIG. 13 is an exemplary display on the administrator portal screen after user registration.

FIG. 13 is an exemplary display of the administrator portal screen 520 after the user registration. Referring to FIG. 13, the user name selected on the user selection screen 530 is included in the user list display area 521 of the administrator portal screen 520.

When the subscription service add button 523 is pushed by the administrator in the administrator portal screen 520 illustrated in FIG. 13 as in step S131 of FIG. 8, the push of the subscription service add button 523 is reported to the apparatus browser unit 121 in step S132. Subsequently, the apparatus browser unit 121 sends a request for acquiring a subscription service selection screen to the collaboration setup unit 22 based on a definition associated with the subscription service add button 523 in the HTML data of the administrator portal screen 520 in step S133. The collaboration setup unit 22 generates HTML data for displaying the subscription service selection screen upon receiving the request and returns a response including the generated HTML data in step S134. At this time, the collaboration setup unit 22 generates the HTML data so that a list of the service names registered in the subscription information memory unit 25 (see FIG. 6) is included as an option.

When the apparatus browser unit 121 receives the response from the collaboration setup unit 22, the apparatus browser unit 121 causes the subscription service selection screen to be displayed on the operations panel 15 based on the HTML data included in the response in step S135.

Figure 14:
FIG. 14 is an exemplary display of a subscription service selection screen.

FIG. 14 is an exemplary display of a subscription service selection screen 540 of the embodiment 1. Referring to FIG. 14, the subscription service selection screen 540 includes check box buttons 541 for each service name of the subscription service (hereinafter, referred to as a subscription service name) and an OK button 542, and so on.

When the administrator selects the check box button 541 corresponding to the subscription service permitted for the event subscriber for subscribing the events in the image forming apparatus 10 and further pushes the OK button 542 in step S136, these operations are reported to the apparatus browser unit 121 in step S137.

In response to the pushing of the Ok button 542, the apparatus browser unit 121 sends an add request for requesting to add the subscription service to the collaboration setup unit 22 in step S138. The add request includes the check-marked (selected) subscription service name and the apparatus number of the image forming apparatus 10. Referring FIG. 14, the check box button 541 of "fax2email" is selected. In this case, "fax2email" is included in the registration request. When the collaboration setup unit 22 receives the add request, the subscription service name designated in the add request is stored in the memory device 203 in association with information of the apparatus number and the user name, which had been previously stored in the memory device 203 in step S128.

Subsequently, the collaboration setup unit 22 generates HTML data for displaying the administrator portal screen 520 and returns a response including the generated HTML data in step S139. When the HTML data are generated and when values of all items to be set up (the user name, the subscription service name and so on) are stored in the memory device 203, the collaboration setup unit 22 adds to a script implementation file including implementation of Java ("Java" is a registered trademark) script. More specifically, a download command in which the file name of the script implementation file is designated is described in the HTML data. Therefore, the apparatus browser unit 121 receiving the HTML data downloads the script implementation file corresponding to the file name designated in the download command from the collaboration setup unit 22 while displaying the HTML data. Said differently, in step S139 of FIG. 8, the HTML data of the administrator portal screen 520 and the administrator portal screen 520 are returned to the apparatus browser unit 121. Specifically, after the HTML data are returned the script implementation file is transferred to the apparatus browser unit 121.

The administrator portal screen 520 displayed based on the HTML data is similar to that illustrated in FIG. 13. However, the registration button is enabled (not displayed by a gray color). A script implementation stored in the script implementation file is a program causing the image forming apparatus 10 to perform processes for making the delivery unit 23 report the events occurring in the image forming apparatus 10 to the event delivery apparatus 20.

Figure 15:
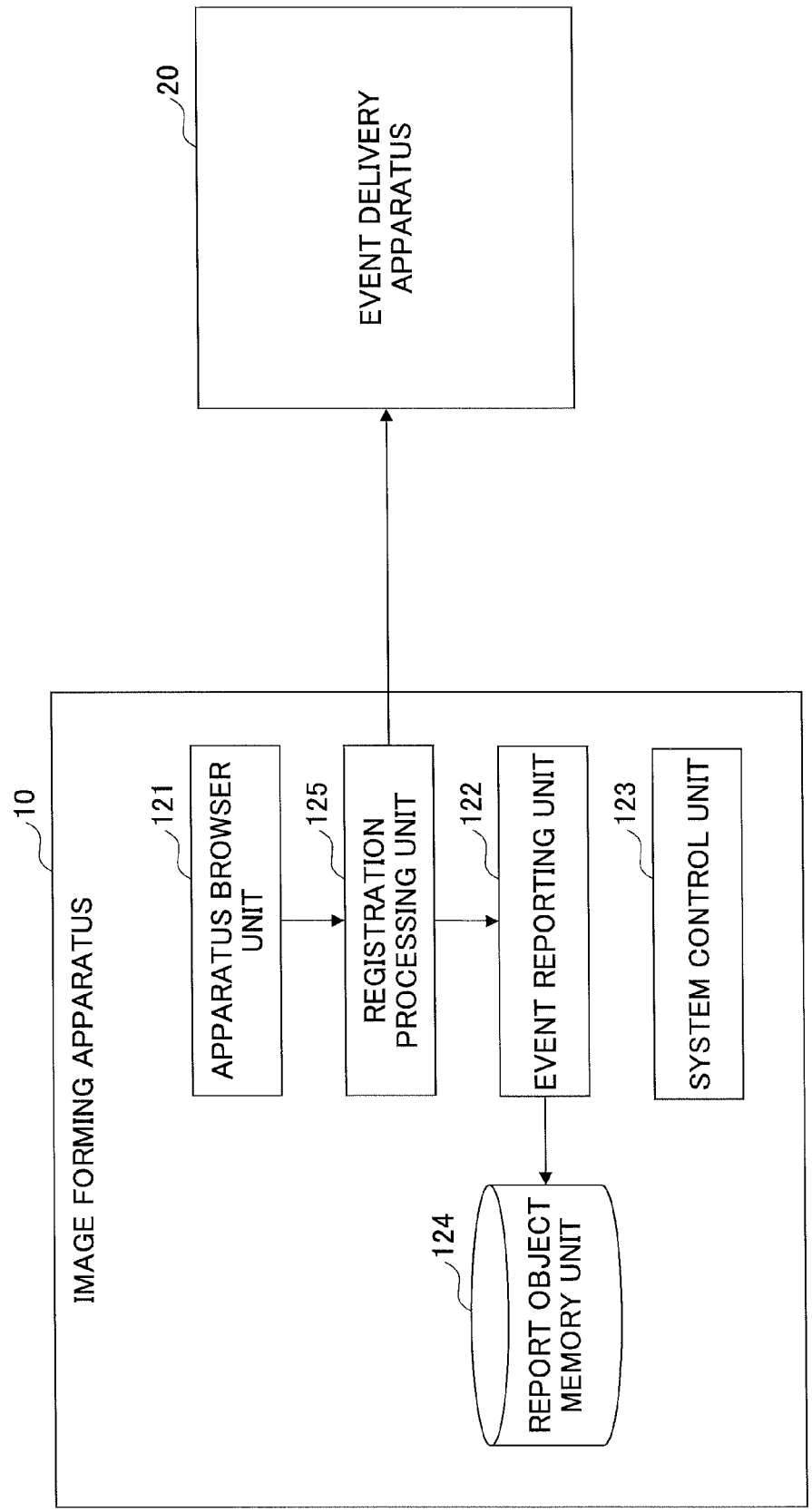
FIG. 15 illustrates an exemplary functional structure of the image forming apparatus after downloading a script implementation file.

When the script implementation file is downloaded by the apparatus browser unit 121 to the image forming apparatus 10 from the collaboration setup unit 22, a functional structure of the image forming apparatus 10 changes to that illustrated in FIG. 15.

FIG. 15 illustrates an exemplary functional structure of the image forming apparatus 10 after downloading a script implementation file. Referring to FIG. 15, the same reference symbols as those in FIG. 4 are given to the same portions as those in FIG. 4, and explanation of these portions is omitted.

Referring to FIG. 15, the registration processing unit 125 is newly added. The registration processing unit 125 is realized by a process executed by the script implementation using the CPU 111. The registration processing unit 125 performs processes for making the event reporting unit 122 report the events occurring in the image forming apparatus 10 to the event delivery apparatus 20. The registration processing unit 125 requests the event delivery apparatus 20 to register a setup content to be set in the administrator portal screen 520.

Here, the apparatus browser unit 121 cannot perform the processes performed by the registration processing unit 125 instead of the registration processing unit 125 before downloading the script implementation file. This is because the apparatus browser unit 121 performs generalized processes as the browser and the processes performed by the registration processing unit 125 are not the generalized processes. Therefore, it is necessary for the apparatus browser unit 121 to download the script implementation file to the image forming apparatus 10. However, the script implementation file may be previously stored in the image forming apparatus 10.

Subsequently, when the administrator pushes the registration button 524 on the administrator portal screen 520 in step S140, the apparatus browser unit 121 invokes functions of Java ("Java" is a registered trademark) script described in the HTML data in accordance with the definition of the HTML data in the administrator portal screen 520.

FIG. 16 illustrates a part of exemplary HTML data defining an administrator portal screen. Referring to FIG. 16, a definition is designated by D1 and descriptions are designated by d1, d21, d22, and d3. The description d1 corresponds to the download command of the script implementation file. The "deviceHook.js" designated as a value of SRC attribute is the file name of the script implementation file.

The description d3 defines invocation of a function (setFaxRx( )) in response to the pushing of the registration button 524. As described later, the function (setFaxRx( )) is used to make the registration processing unit 125 perform a process of setting a fax receipt event in the event reporting unit 122 as a report object. Here, the report object is limited only to the fax receipt. This is because the collaboration setup unit 22 determines that the event type to be reported from the image forming apparatus 10 is the fax receipt, as the result of the add request for the subscription service performed in step S138. Said differently, the collaboration setup unit 22 determines that the event types included in the subscription event list stored in the subscription information memory unit 25 are to be reported by the image forming apparatus 10 associated with the subscription service added by the add request. The collaboration setup unit 22 describes invocation of the setFaxRx function in the description d3 based on the determination. Therefore, if another event type is included in the subscription event list, the collaboration setup unit 22 adds the function corresponding to the other event type to the description d3. As described, the selection of the subscription services on the subscription service selection screen 540 corresponds to the selection of the event types reported by the image forming apparatus 10 (the event reporting unit 122) to the event delivery apparatus 20.

The description d21 defines invocation of the setFaxRx function. The description d22 is a command for displaying a screen to be executed after invoking the setFaxRx function.

Therefore, if the registration button 524 is pushed, the apparatus browser unit 121 invokes the setFaxRx function defined (included) in the definition 21 to respond to the description d3. The implementation of the setFaxRx function is defined (included) in the script implementation file. Therefore, the apparatus browser unit 121 performs steps S141, S143, and S150 using the registration processing unit 125 realized by the script implementation file.

The apparatus browser unit 121 uses the registration processing unit 125 to send a start report for reporting that the setup content in the administrator portal screen 520 is registered to the collaboration setup unit 22 in step S141. The start report includes an apparatus number. The collaboration setup unit 22 reports the start report to the delivery unit 23 in step S142. The delivery unit 23 stores the apparatus number included in the start report in, for example, the memory device 203.

Subsequently, the apparatus browser unit 121 uses the registration processing unit 125 in order to request the event reporting unit 122 to make the fax receipt be the report object in step S143. Subsequently, the event reporting unit 122 stores the fax receipt event in the report object memory unit 124 so as to be the report object requested to be reported as above in step S144.

Figure 17:
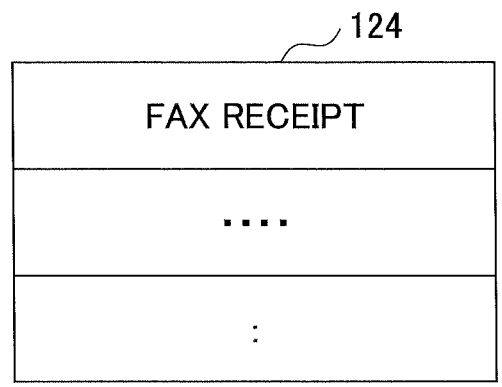
FIG. 17 illustrates an exemplary structure of a report object memory unit.

FIG. 17 illustrates a structural example of the report object memory unit 124. As illustrated in FIG. 17, the report object memory unit 124 stores the list of the event types to be the report object.

Subsequently, the event reporting unit 122 sends a report for starting to report the event (i.e., an event report start report) to, for example, the delivery unit 23 in step S145. The event report start report is reported to, for example, the delivery unit 23 as an HTTP request in response to the request from the apparatus browser unit 121. The event report start report includes information indicating that the event type of the report object is the fax receipt and information of the apparatus number. The delivery unit 23 determines that the event report start report is correct when the apparatus number included in the event report start report is the same as the apparatus number included in the start report reported by the collaboration setup unit 22 in step S142. The delivery unit 23 instructs the collaboration setup unit 22 to register the apparatus number and the event type as the object of the event delivery in step S146. The instruction includes the apparatus number and the event type (the fax receipt event), which are included in the event report start report, to be registered as the object of the event delivery.

Upon the instruction, the collaboration setup unit 22 stores the setup content such as the apparatus number, the user name and the subscription service name which is set via the administrator portal screen 520 and stored in the memory device 203 and in the collaboration information memory unit 26 in step S147. At this time, the apparatus number and the event type included in the instruction are referred to.

FIG. 18 illustrates an exemplary structure of the collaboration information memory unit 26. Referring to FIG. 18, the collaboration information memory unit 26 stores the apparatus number, the subscription service name, the user name, the apparatus attribute information, and so on.

The apparatus number belongs to the image forming apparatus 10 associated with the subscription service. The subscription service name belongs to the subscription service associated with the image forming apparatus 10. The user name belongs to a user who is permitted to use the subscription service using the image forming apparatus 10. The apparatus attribute information is attribute information of the image forming apparatus 10. For example, the apparatus attribute information includes an installation location name, an IP address, and an apparatus name (a host name) of each image forming apparatus. The user can identify the image forming apparatuses 10 using the apparatus attribute information. The apparatus attribute information may be transferred from the apparatus browser unit 121 in step S128 in FIG. 7 or step S133 in FIG. 8 and stored in the memory device 203, or may be transferred from the apparatus browser unit 121 in step S141 and stored in the memory device 203.

If plural subscription service names are designated for one apparatus number, records respectively corresponding to the subscription service names may be recorded, or one record may be divided so as to correspond to the subscription service names.

Subsequently, the delivery service 23 returns a response to the event report start report to the event reporting unit 122 in step S148. The event reporting unit 122 returns a response to step S143 to the apparatus browser unit 121 in step S149. Subsequently, the apparatus browser unit 121 uses the registration processing unit 125 to send a confirmation request for confirming whether the registration is normally done to the collaboration setup unit 22 in step S150. At this time, the apparatus number is included in the confirmation request. The collaboration setup unit 22 confirms that information of the apparatus identified by the apparatus number in the confirmation request, the information being stored in the memory device 203, is also stored in the collaboration information memory unit 26. If the information is also stored in the collaboration information memory unit 26, the collaboration setup unit 22 sends a response indicative of the completion of the registration to the apparatus browser unit 121 in step S151.

Upon receipt of the response, the apparatus browser unit 121 causes a screen for reporting the completion of the registration (hereinafter, a registration completion reporting screen) to be displayed on the operations panel 15 in step S152 based on the description 22 of the definition D1 on the administrator portal screen 520.

Figure 19:
FIG. 19 is an exemplary display of a registration completion reporting screen.

FIG. 19 illustrates an exemplary display of a registration completion reporting screen 550. Referring to FIG. 19, the registration completion reporting screen 550 includes a message described in the description d22. The administrator refers to the message in order to recognize that the registration is completed.

Subsequently, after the processes illustrated in FIGS. 7 and 8, a registration process for registering in the subscription service for the user terminal is performed. The registration process is performed in an asynchronous manner with the processes illustrated in FIGS. 7 and 8.

Figure 20:
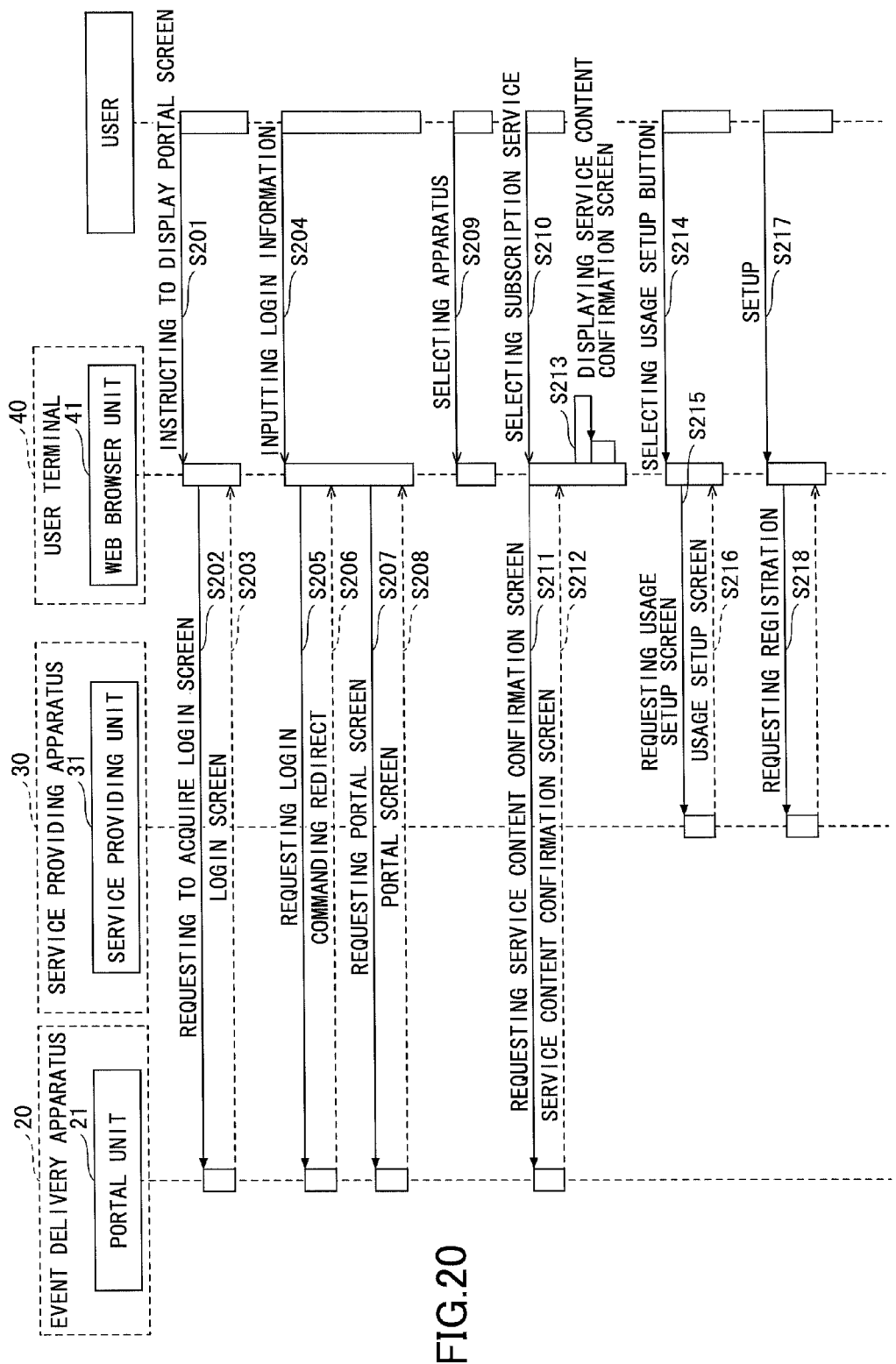
FIG. 20 is a sequence chart for explaining an exemplary registration process of subscription service for a user terminal.

FIG. 20 is a sequence chart for explaining an exemplary registration process of the subscription service for the user terminal.

For example, when a user A inputs the URL of a user portal screen of the event delivery service to the user terminal 40 in step S201, and the Web browser unit 41 sends an HTTP request for requesting to acquire a login screen to the URL in step S202. The portal unit 21 of the event delivery apparatus 20 sends an HTTP response including HTML data for displaying the login screen upon receipt of the HTTP request in step S203.

When the apparatus browser unit 41 receives the HTTP response, the Web browser unit 41 causes the login screen to be displayed on a display panel of the user terminal 40 based on the HTML data included in the HTTP response. For example, a login screen similar to the login screen 510 illustrated in FIG. 9 is displayed. When login information such as the user name and the password is input by a user in the login screen in step S204, the Web browser unit 41 sends a login request (an authentication request) for the administrator to the portal unit 21 of the event delivery apparatus 20 in step S206. The portal unit 21 refers to the user information memory unit 24 to authorize the user name and the password designated in the login request. When a user name included in the login request, the user name corresponding to the password, and the password are stored in the user information memory unit 24, it is determined that the authorization is successful.

When the authorization is successful, the portal unit 21 returns a redirect command by which the URL of the user portal screen is the redirect destination to the Web browser unit 41 in step S206. For example, the redirect command includes a session ID generated in association with the user name of the login user who had successfully logged in as a parameter designated at a time of the redirection.

When the apparatus browser unit 41 receives the redirect command, the Web browser unit 41 sends a request for acquiring the user portal screen to the URL of the redirection destination in step S207. The Web browser unit 41 stores the session ID included in the redirect command into, for example, a memory installed in the user terminal 40. This session ID is designated when the Web browser unit 41 requests in or after step S207.

The portal unit 21 of the event delivery apparatus 20 acquires information associated with the user name which is associated with the session ID from the collaboration information memory unit 26 in FIG. 18 in response to the request. The portal unit 21 generates HTML data for causing the user portal screen display based on the information. Subsequently, the portal unit 21 returns a response including the HTML data to the user terminal in step S208. The Web browser unit 41 causes the portal screen of a user A to be displayed on a display panel of the user terminal 40 based on the HTML data included in the response when the Web browser unit receives the response.

Figure 21:
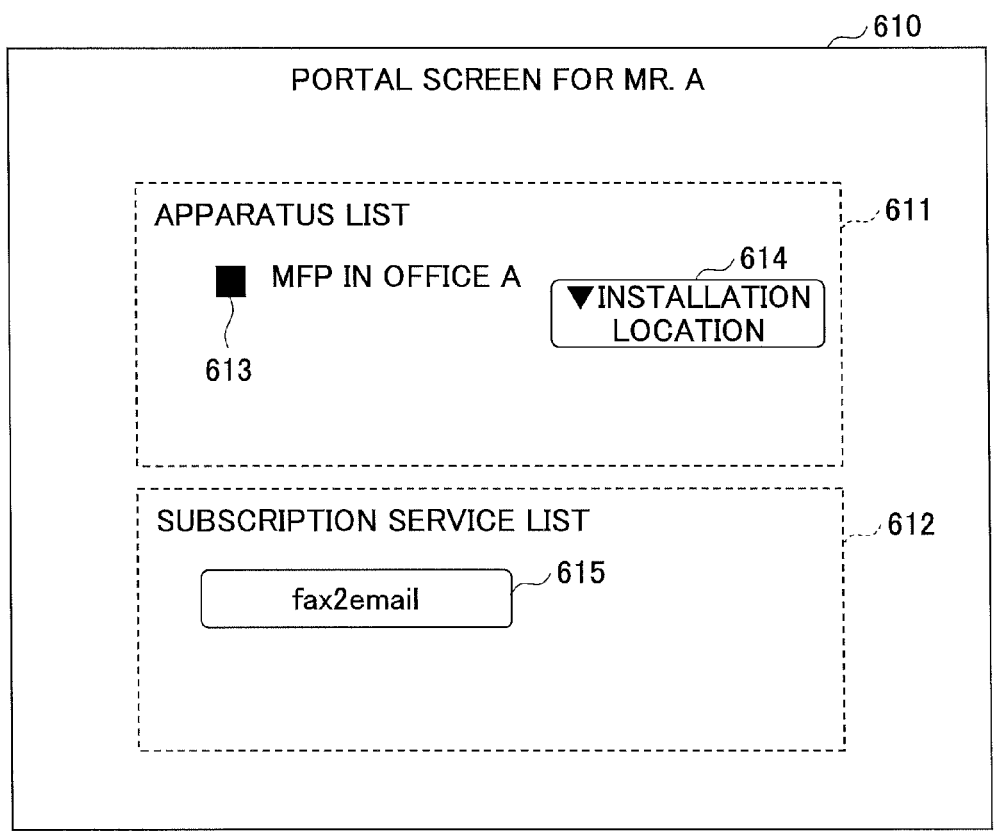
FIG. 21 is an exemplary display of a user portal screen.

FIG. 21 is an exemplary display of a user portal screen 610. Referring to FIG. 21, the user portal screen 610 includes an apparatus list display area 611, a subscription service list display 612, and so on.

The apparatus list display area 611 displays a check box button 613 and identification information 614 for each image forming apparatus 10 related to an apparatus number related to a login user (the user A) in the collaboration information memory unit 26. Therefore, when the processes illustrated in FIGS. 7 and 8 are performed in plural of the image forming apparatuses 10 for the user A, the apparatus list display area 611 displays plural check box buttons 613 and so on. The identification information of the image forming apparatus 10 can be switched to information assisting the user to identify such as an installation location name, an IP address, an apparatus name, and an apparatus number. FIG. 21 illustrates an example in which the installation location is displayed as the identification information 614. The information used as the identification information (character string) is acquired by the collaboration information memory unit 26 from the apparatus attribute information or the apparatus number, which are associated with the login user.

The subscription service list display area 612 displays a selection button 615 for each subscription service associated with the login user (the user A) in the collaboration information memory unit 26. Therefore, plural selection buttons 615 are displayed on the subscription service list display area 612 when the plural subscription services are added to the administrator portal screen for the user A.

The user selects the check box button 613 corresponding to the image forming apparatus 10 of which a fax event is required to be monitored by the user in step S209. Then, the user selects the selection button 615 corresponding to the fax receipt report service in step S210. The Web browser unit 41 sends the acquisition request for acquiring a screen for confirming the service content of the fax receipt report service (hereinafter, referred to as a "service content confirmation screen") based on the definition of the HTML data by which the portal screen 610 is displayed to the portal unit 21 in step S211. The acquisition request includes the apparatus number of the image forming apparatus 10 (the corresponding check box button 613 is check-marked) and the service name of the subscription service corresponding to the selected selection button 615.

The portal unit 21 acquires information corresponding to the service name included in the acquisition request from the subscription information memory unit 25 (see FIG. 6). The portal unit 21 generates HTML data causing the service confirmation screen to be display based on the information. Subsequently, the portal unit 21 returns a response including the HTML data to the user terminal in step S212.

Figure 22:
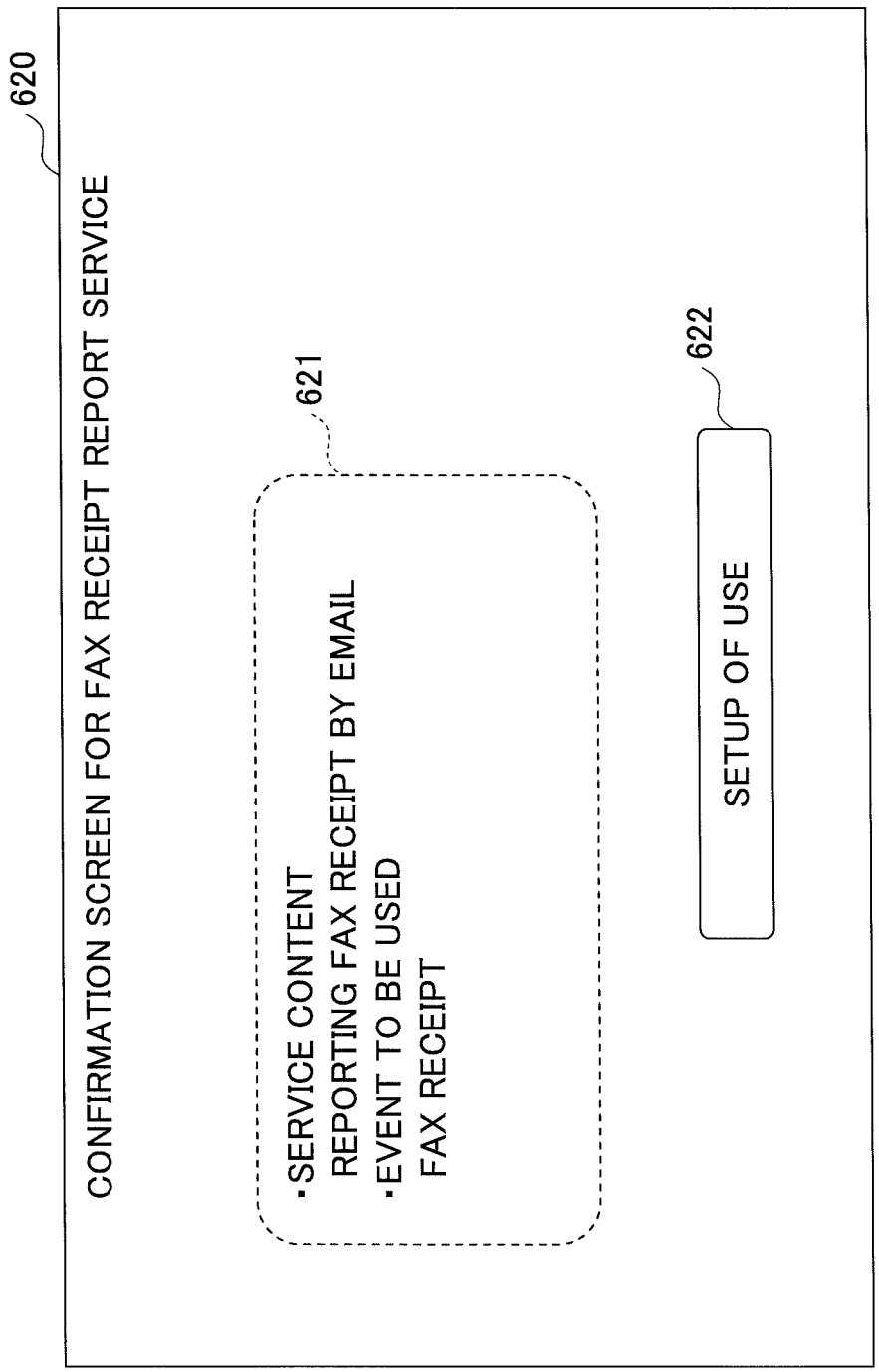
FIG. 22 is an exemplary display of a service confirmation screen.

FIG. 22 illustrates an exemplary service confirmation screen 620. Referring to FIG. 22, the service confirmation screen 620 includes a service information display area 621 and a usage setup button 622. On the service information display area 621, a service content, an event to be used, and so on are displayed. The information to be displayed on the service display area 621 is registered in the subscription information memory unit 25. The information is acquired from the service content, the subscription event list and so on, which are registered in connection with the fax receipt report service from the subscription information memory unit 25. The usage setup button 622 is linked to the usage setup URL, which is registered in the fax receipt report service in the subscription information memory unit 25. Further, the apparatus number designated in the request of step S211 and a user name associated with the session ID of the request are added to the usage setup URL as parameters for the link.

When the usage setup button 622 is selected by the user in step S214, the Web browser unit 41 sends an acquisition request for acquiring a usage setup screen to a usage setup URL set in the usage setup button 622 in step S215. This acquisition requests includes the apparatus number and the user name. When the service providing unit 31 of the service providing apparatus 30 receives the acquisition request, the service providing unit 31 returns the response including the HTML data for displaying the usage setup screen in step S216. The Web browser unit 41 causes the usage setup screen to be displayed based on the HTML data included in the response.

Figure 23:
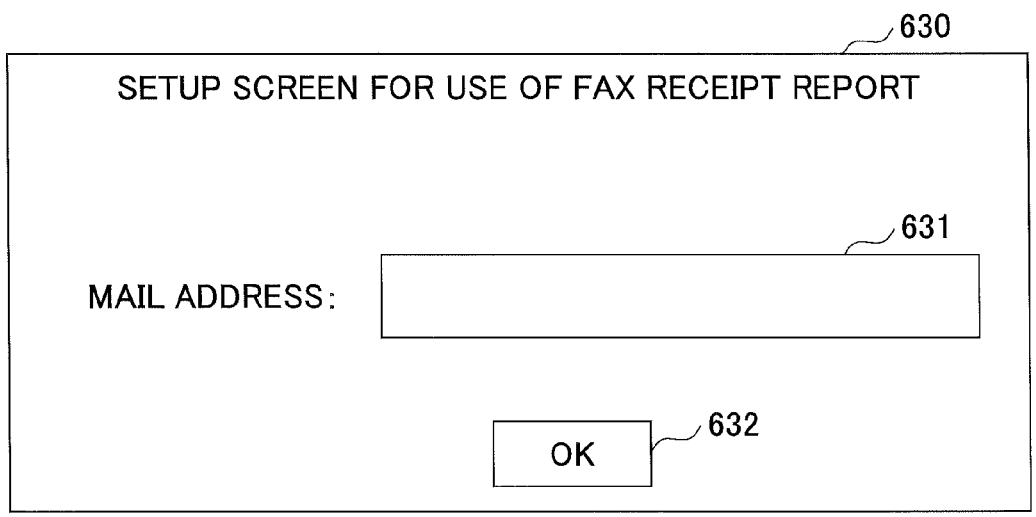
FIG. 23 illustrates an exemplary display of a setup screen for use.

FIG. 23 is an exemplary display of a usage setup screen 630. Referring to FIG. 23, the usage setup screen 630 includes a mail address input area 631, an OK button 632, and so on.

When the user inputs the mail address and the OK button 632 is pushed in step S217, the Web browser unit 41 sends a registration request to the service providing unit 31 in step S218. The registration request includes the input mail address, the user name, the apparatus number, and so on based on the definition of the HTML data of the usage setup screen 630.

The service providing unit 31 stores (registers) the user name, the mail address, the apparatus number, and so on in the setup information memory unit 32 which are included in the registration request.

Figure 24:
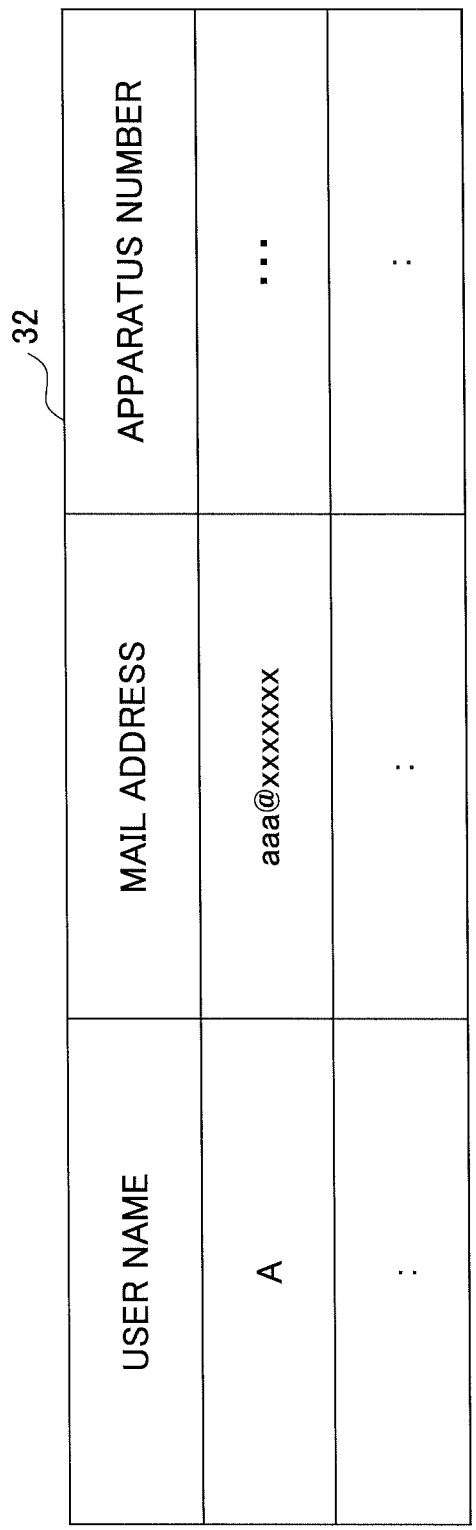
FIG. 24 illustrates an exemplary structure of a setup information memory unit.

FIG. 24 illustrates an exemplary structure of a setup information memory unit 32. Referring to FIG. 24, the setup information memory unit 32 stores the user name, the mail address, the apparatus number and so on for each user of the fax receipt report service.

Thus, the setup process for reporting the fax receipt event occurring in the image forming apparatus 10 to the user A ends. Next, processes performed when an event which occurs in the image forming apparatus 10 and set as a report object are described.

Figure 25:
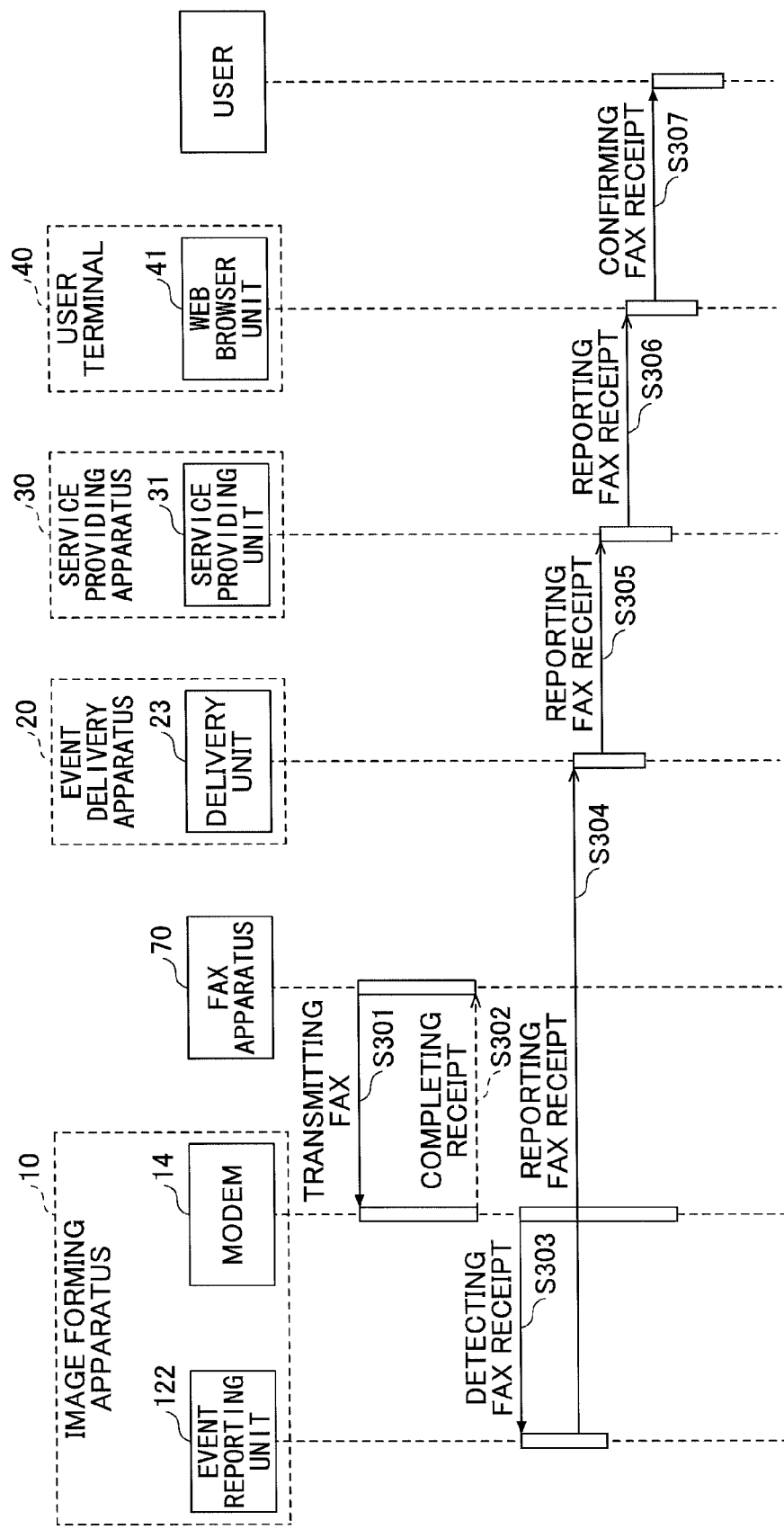
FIG. 25 is a sequence chart for explaining an exemplary process performed in response to a fax receipt.

FIG. 25 is a sequence chart for explaining an exemplary process performed in response to the fax receipt.

For example, a fax apparatus 70 located outside the image forming apparatus 10 performs fax transmission to the image forming apparatus 10 in step S301, the modem 14 of the image forming apparatus 10 receives the fax and returns a receipt completion report to the FAX apparatus 70 in step S302.

The event reporting unit 122 detects a fax receipt event by the modem 14 in step S303. Specifically, the fax receipt is detected by the system control unit 123, and the fax receipt event is reported to the event reporting unit 122. The event reporting unit 122 acquires an apparatus number, a receipt date, sender information, received image, and so on related to the detected fax receipt event by, for example, the system control unit 123.

For example, the event reporting unit 122 detects an occurrence of an event of a specific type by setting an event handler in the system control unit 123 or by monitoring (polling) whether the event is generated. The specific type of the event may be stored in the report object memory unit 124. The event handler is a function called up when the event occurs.

Subsequently, the event reporting unit 122 sends report information of the fax receipt event to the delivery unit 23 of the event delivery apparatus 20 in step S304. For example, the report information includes an event type (the fax receipt event), the receipt date, the sender information, the receiving image, and the apparatus number of the image forming apparatus 10.

The delivery unit 23 specifies a subscription service of which event type included in the report information of the subscription service is one of the subscription event list with reference to the subscription information memory unit 25 (see FIG. 6). When there is a corresponding subscription service, the delivery unit 23 transfers the report information to the callback URL of the subscription service in step S305. Within the embodiment 1, the report information of the fax receipt event is transferred to the service providing unit 31.

When the service providing unit 31 receives the report information, the service providing unit 31 searches for a record including the apparatus number in conformity with the apparatus number contained in the report information among the records stored in the setup information memory unit 32 (see FIG. 24). The apparatus number is used as filter information or a condition for specifying the report destination of the FAX report event.

When there is a corresponding record, the service providing unit 31 sends an electronic mail to a mail address stored in the record in step S306. When there are plural corresponding records, an electric mail is sent to plural mail addresses. The electric mail includes receipt data, sender information, a receipt image, or the like of the fax receipt.

The user can browse the electric mail in the user terminal 40 and confirm a receipt of fax, the receipt content (a FAX image), and so on from a distant place.

As described, within the embodiment 1, the events occurring in the image forming apparatus 10 can be detected by an information processing apparatus (the event delivery apparatus 20) provided outside the image forming apparatus 10. Therefore, it is possible to provide a service having high convenience upon occurrence of the event as in, for example, the service providing unit 31 of the service providing apparatus 30.

Events of the image forming apparatus 10 are pushed from the image forming apparatus 10 to the event delivery apparatus 20. Said differently, the event delivery apparatus 20 does not poll an occurrence of the event in the image forming apparatus 10. Instead, the image forming apparatus actively reports the events. Therefore, in comparison with the polling, the load on the network communication can be reduced. Especially, as the number of the image forming apparatuses 10 become greater than the number of the event delivery apparatuses 20, the effect of the communication load becomes great.

Within the embodiment, processes performed by the apparatus browser unit 121 and the registration processing unit 125 may be performed by an application program installed as a plugin to the image forming apparatus 10. In this case, the content set up via the administrator portal screen 520 may be stored in, for example, the HDD 114 at a time of installing the application program as setup information of the application program. By this, the application program can cause the image forming apparatus 10 to perform the processes performed by the apparatus browser unit 121 and the registration processing unit 125 without inputs in the administrator portal screen 520 in response to an invocation of the application program.

However, it is useful for the user to omit an installation of the application program.

Within the embodiment, the fax receipt event is described as an event to be monitored and to be delivered. However, the event to be monitored and to be delivered is not specifically limited. For example, transition to an energy saving mode, recovery from the energy saving mode, display of an authentication screen, display of an alarm screen for reporting jamming or the like may be monitored and delivered. Events for changes in various operational setups such as a change of a paper size in a tray, a change of network setup, a change of authentication setup, or a change of operation setup of an application program may be may be monitored and delivered. Further, events related to operations of hard keys or soft keys in the operations panel 15 may be monitored and delivered. Further, an event related to a structural change of the image forming apparatus 10 such as update of firmware may be monitored and delivered. Further, an event related to a change of counter information used for a memory usage and a fee charge may be monitored and delivered. The change of counter information is, for example, an arrival at a threshold value. Further, events such as wait, execution, pause, and completion of print; wait, execution, pause, and completion of scan; and wait, execution, pause, and completion of fax transmission may be monitored and delivered.

Within the embodiment, information of the events occurring in the image forming apparatus 10 is sent to the user terminal 40 via the service providing apparatus 30. However, the information may be directly sent from the event delivery apparatus 20 to the user terminal 40. Said differently, the user terminal 40 may be registered in the event delivery apparatus 20 as a subscriber.

Next, an embodiment 2 is described. Differences of the embodiment 2 from the embodiment 1 are described. Features of the embodiment 2 which are not specifically described are substantially the same as those of the embodiment 1.

Figure 26:
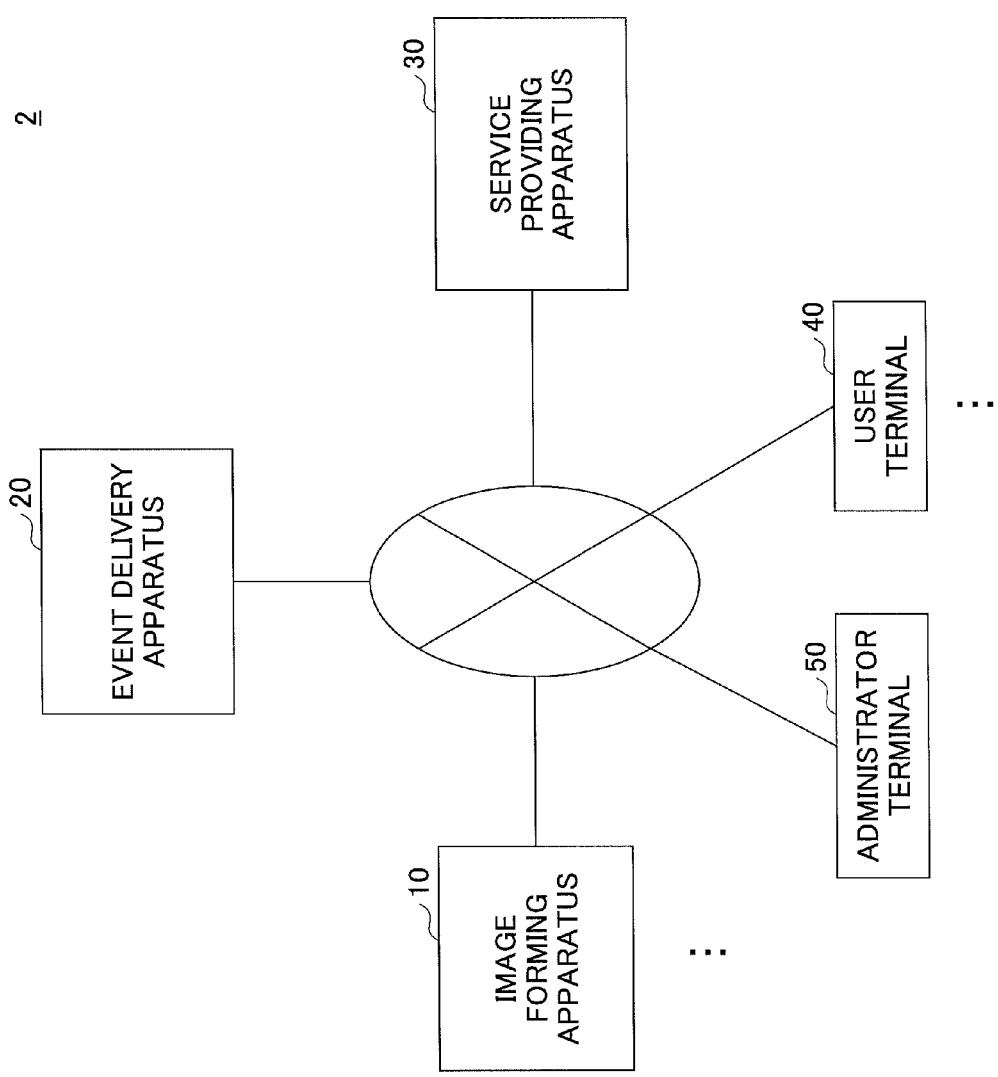
FIG. 26 illustrates an exemplary structure of an information processing system of an embodiment 2.

FIG. 26 illustrates an exemplary structure of the information processing system of the embodiment 2. The information processing system 2 illustrated in FIG. 26 further includes an administrator terminal 50. The administrator terminal 50 is used by an administrator of the image forming apparatus 10. One of plural user terminals 40 may be used as the administrator terminal 50. An example of the administrator terminal 50 is a desktop personal computer (PC), a notebook personal computer, a personal digital assistant (PDA), a tablet-type terminal, a smart phone, a mobile phone, or the like.

Figure 27:
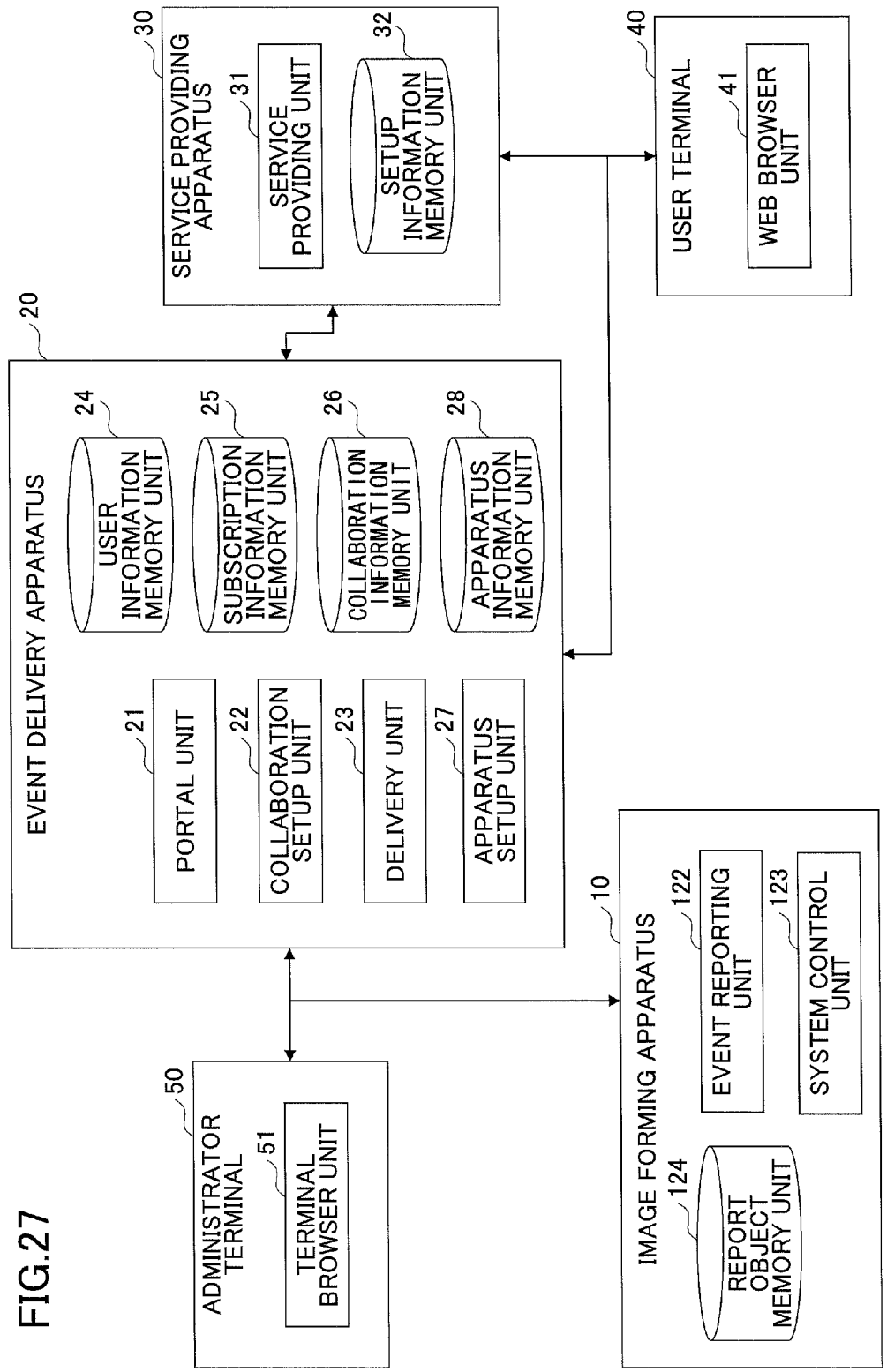
FIG. 27 illustrates an exemplary structure of the information processing system of the embodiment 2.

FIG. 27 illustrates an exemplary structure of the information processing system of the embodiment 2.

Referring to FIG. 27, the administrator terminal 50 includes a terminal browser unit 51. The terminal browser unit 51 is realized by an ordinary Web browser program of causing a CPU of the administrator terminal 50 to execute. The terminal browser unit 51 realizes a function similar to that the ordinary Web browser.

The image forming apparatus 10 of the embodiment 2 may not always include the apparatus browser unit 121. This is because the administrator uses the administrator terminal 50 to operate the system in the embodiment 2. Therefore, referring to FIG. 27, the apparatus browser unit 121 is not illustrated.

The event delivery apparatus 20 of the embodiment 2 further includes an apparatus setup unit 27 and an apparatus information memory unit 28, and so on. The apparatus setup unit 27 sets a content of setup work performed via the administrator terminal 50 in the image forming apparatus 10. The apparatus information memory unit 28 stores attribute information of image forming apparatuses 10 (hereinafter, referred to as "apparatus information") administered by the administrator.

The apparatus setup unit 27 is realized when a program installed in the event delivery apparatus 20 is executed by the CPU 204. The apparatus information memory unit 28 is realized by a memory unit or the like such as the auxiliary memory device 202, and the collaboration information memory unit 26 can be realized by using the auxiliary memory device 202 or a memory device connected to the event delivery apparatus 20 via a network.

Hereinafter, the procedure by the information processing system 2 is described. First, the registration process of the apparatus information to the apparatus information memory unit 28 of the event delivery apparatus 20 is described.

Figure 28:
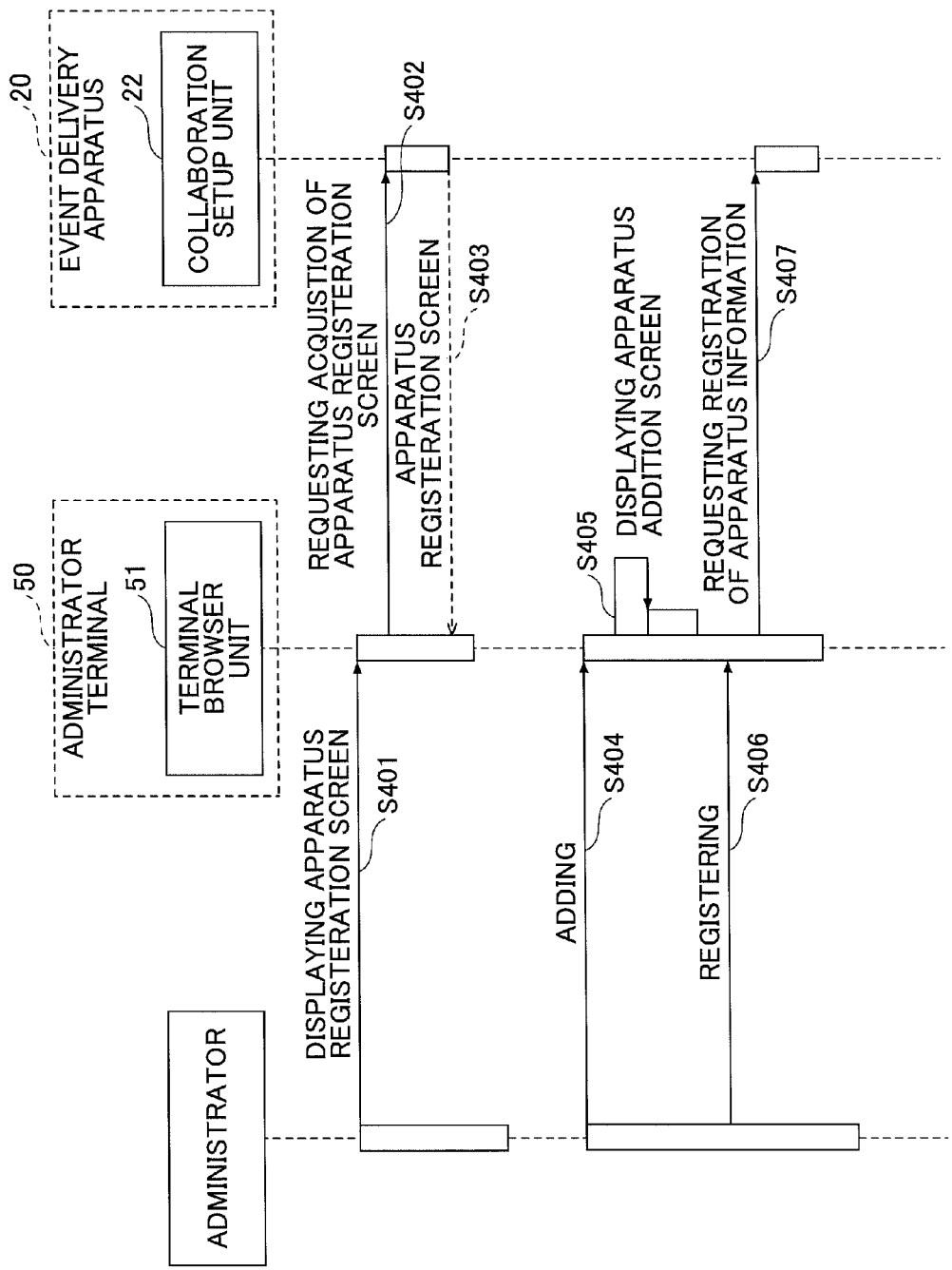
FIG. 28 is a sequence chart for explaining an exemplary registration process for apparatus information.

FIG. 28 is a sequence chart for explaining an exemplary registration process for apparatus information. Before the process illustrated in FIG. 28 is performed, a session is opened between the terminal browser unit 51 and the collaboration setup unit 22 of the event delivery apparatus 20. The session IDs are designated for each request from the terminal browser unit 51. When the session is opened, the authentication is performed for the administrator. The name of the administrator is associated with the session ID as the login user name and stored in the memory device 203 of the event delivery apparatus 20.

In step S401, the administrator inputs a display instruction of the apparatus registration screen to the terminal browser unit 51. In the display instruction, the URL for the apparatus registration screen is designated. The apparatus registration screen is provided for the administrator to input a registration instruction of registering the apparatus information. Subsequently, the terminal browser unit 51 sends an HTTP request for requiring acquisition of the apparatus registration screen to the URL in step S402. The collaboration setup unit 22 of the event delivery apparatus 20 generates HTTP data for displaying the apparatus registration screen in response to the receipt of the request, and sends an HTTP response including the HTML data for displaying the apparatus registration screen upon receipt of the HTTP request in step S403. When the HTML data are generated, the apparatus information memory unit 28 is referred to.

FIG. 29 illustrates an exemplary structure of an apparatus information memory unit 28. Referring to FIG. 29, the apparatus information memory unit 28 stores apparatus numbers, apparatus names, installation locations, IP addresses, administrator names and so on for each image forming apparatus 10. Said differently, the these items form the apparatus information. The meanings of the items are as described above. The IP address of the second record in FIG. 29 is "FW". "FW" stands for installation of the firewall. Said differently, the "FW" means that the image forming apparatus is not externally accessible because the firewall exists. Records stored in the apparatus information memory unit 28 when the HTML data of the apparatus registration screen are generated are records registered when the process illustrated in FIG. 28 has been performed in the past.

When the terminal browser unit 51 receives a response from the collaboration setup unit 22, the terminal browser unit 51 causes the apparatus registration screen to be displayed on a display device of the administrator terminal 50 based on the HTML data included in the response.

FIG. 30 is an exemplary display of the apparatus registration screen. Referring to FIG. 30, an apparatus registration screen 560 includes an apparatus list display area 561, an add button 562, a registration button 563, and so on.

On the apparatus list display area 561, a list of the apparatus information items already stored in the apparatus information memory unit 28 is displayed. The apparatus information relates to the image forming apparatus 10 controlled under the administrator. Said differently, the collaboration setup unit 22 acquires the record including the administrator name which is stored in the memory device 203 in association with the session ID in step S402. Here, the session ID is designated by the acquisition request of the apparatus registration screen 560 in step S402. The collaboration setup unit 22 generates the HTML data of the apparatus registration screen 560 so that the apparatus information stored in the acquired records is displayed on the apparatus list display area 561. FIG. 30 illustrates the exemplary apparatus list display area 561 when the administrator name of the current administrator is "A".

The add button 562 is a button for adding new apparatus information. Said differently, if the add button is pushed in step S404, the terminal browser unit 51 causes an apparatus addition screen to be displayed on the display device of the administrator terminal 50 in conformity with definition of the HTML data of the apparatus registration screen 560.

FIG. 31 is an exemplary display of the apparatus addition screen. Referring to FIG. 31, the apparatus addition screen 570 includes the apparatus information setup area 571 and the OK button 572.

The apparatus information setup area 571 is provided for inputting various values of the items constituting the apparatus information such as the apparatus number, the apparatus name, the installation location and the IP address. When an external access is limited by a firewall in the image forming apparatus 10 of which apparatus information is to be registered, the value of the IP address becomes "FW".

When the values of the items are inputted in the apparatus information setup area 571 and the OK button 572 is pushed, the terminal browser unit 51 displays the apparatus registration screen 560 again. At this time, a row including the apparatus information input in the apparatus addition screen 570 is newly added to the apparatus list display area 561.

When the administrator pushes the registration button 563 of the redisplayed apparatus registration screen 560 in step S406, the terminal browser unit 51 sends the registration request of the apparatus information to the collaboration setup unit 22 in step S407 in conformity with the definition corresponding to the push of the registration button 563 in the HTML data of the apparatus registration screen 560. The registration request designates the apparatus information input via the apparatus addition screen 570 in addition to the session ID.

The collaboration setup unit 22 stores the new record including the apparatus information designated (included) in the registration request in the apparatus information memory unit 28 when the registration request of the apparatus information is received. The administrator name stored in the memory device in association with the session ID designated in the registration request is registered in the item of the "administrator name" of the record.

The processes of registering the apparatus information are not limited to those described in FIG. 28. For example, the administrator terminal 50 may search the image forming apparatuses 10. The apparatus information of the image forming apparatus 10 selected by the administrator of the searched image forming apparatuses 10 is sent to the event delivery apparatus 20 and stored in the apparatus information memory unit 28.

Subsequently, processes of the embodiment 2 are changed from the processes of the embodiment 1 as follows. The administrator uses the administrator terminal 50 to operate the system in the embodiment 2. The image forming apparatus 10 illustrated in FIG. 7 is substituted for (replaced) by the administrator terminal 50. The apparatus browser unit 121 illustrated in FIG. 7 is substituted for by the terminal browser unit 51. Further, the operations panel 15 may be substituted for by the input device and the display device of the administrator terminal 50.

Figure 32:
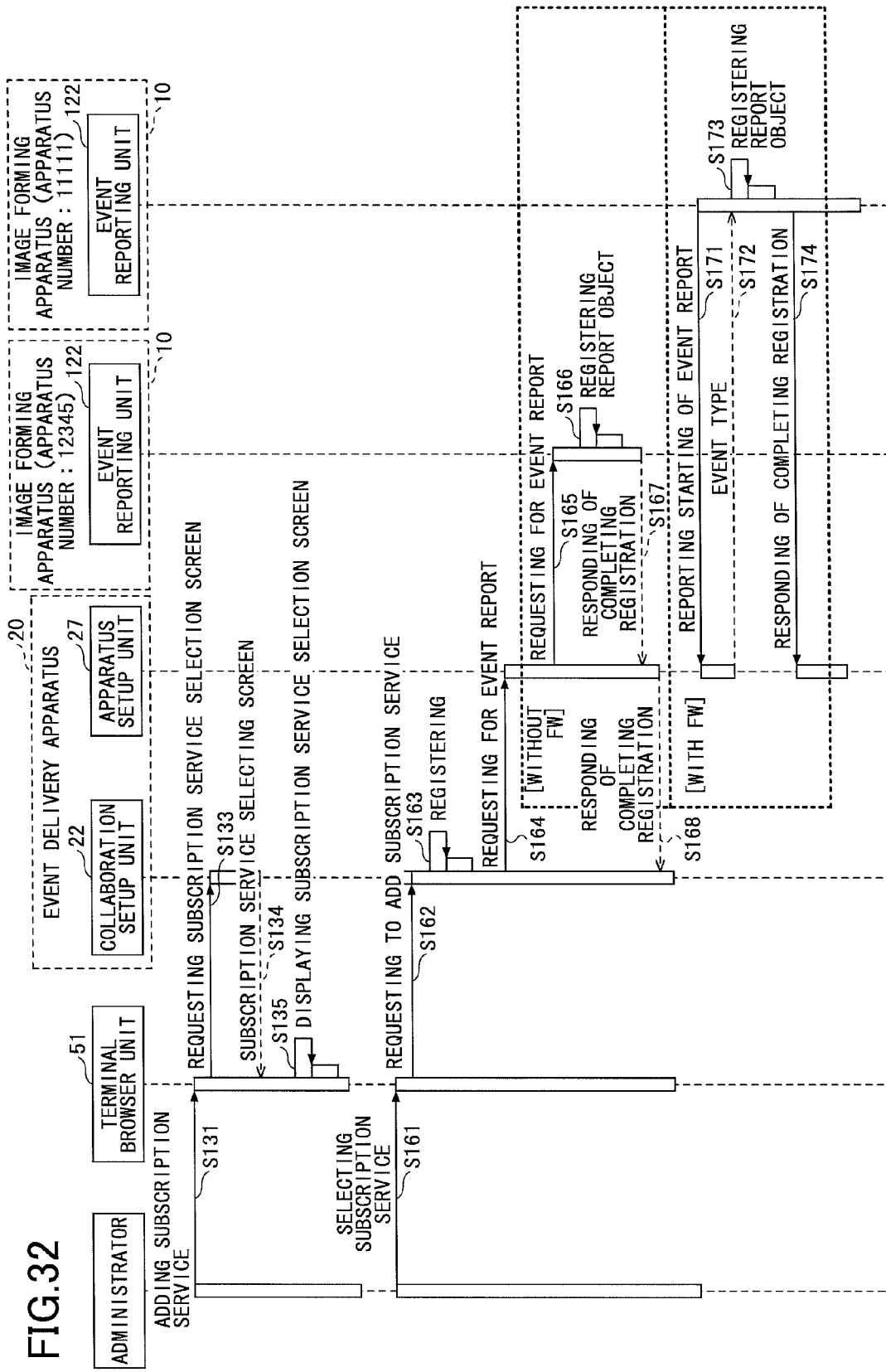
FIG. 32 is a sequence chart for explaining an exemplary setup process for collaboration between an image forming apparatus and subscription service of the embodiment 2.

The sequence chart illustrated in FIG. 8 is replaced by the sequence chart illustrated in FIG. 32.

FIG. 32 is a sequence chart for explaining an exemplary setup process for collaboration between the image forming apparatuses 10 and subscription service of the embodiment 2. Referring to FIG. 32, the same reference symbols as those in FIG. 8 are given to the same portions as those in FIG. 8, and explanation of the same portions is omitted.

Figure 33:
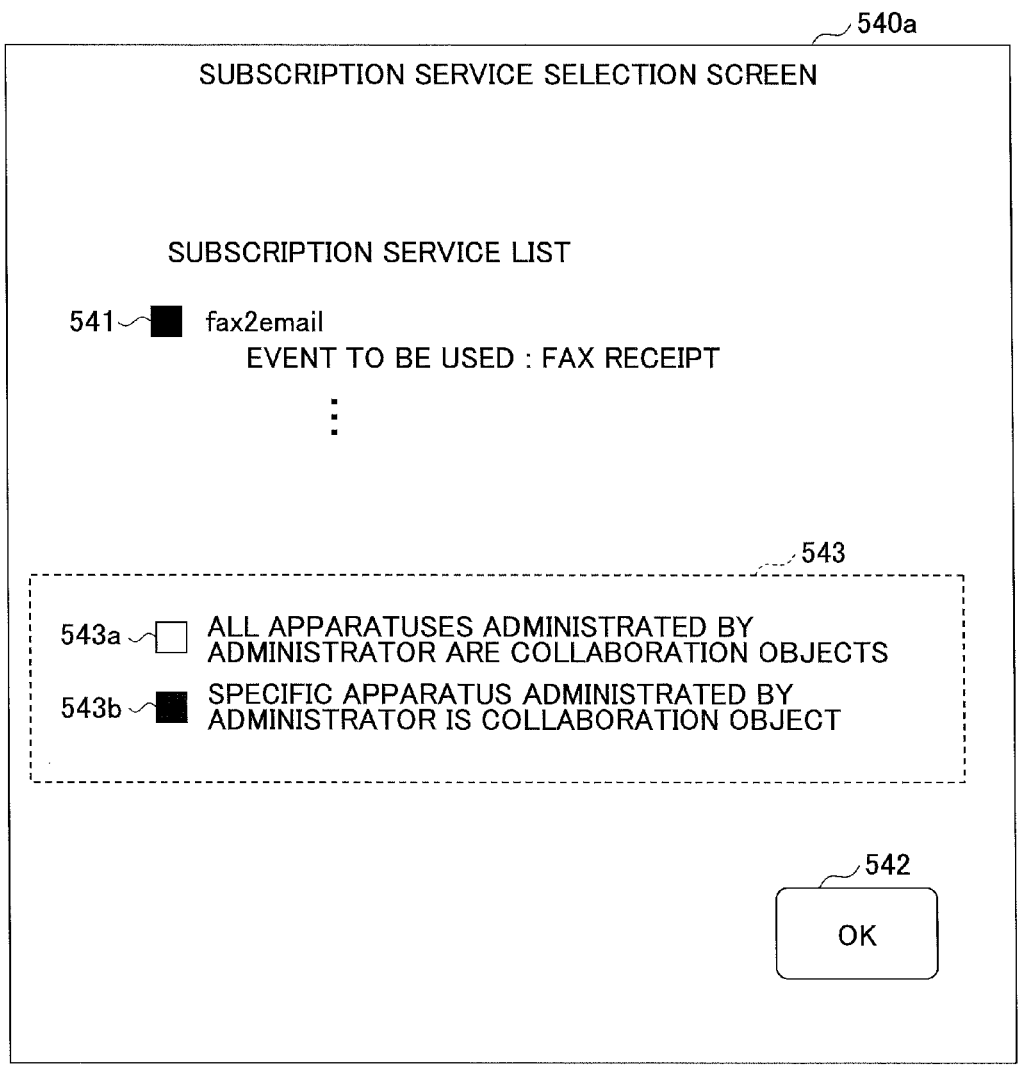
FIG. 33 is an exemplary display of a subscription service selection screen of the embodiment 2.

Within the embodiment 2, a subscription service selection screen 540a illustrated in FIG. 33 is displayed on the display device of the administrator terminal 50 by the terminal browser unit 51 in step S135.

FIG. 33 is an exemplary display of the subscription service selection screen 540a of the embodiment 2. Referring to FIG. 33, the same reference symbols as those in FIG. 14 are given to the same portions as those in FIG. 33, and explanation of these portions is omitted.

Referring to FIG. 33, the subscription service selection screen 540a includes a collaboration apparatus designation area 543a. In the collaboration apparatus designation area 543a, the administrator may select whether all apparatuses administered by the administrator are the collaboration object or a specific apparatus administered by the administrator is the collaboration object.

Referring to FIG. 33, when the OK button 542 is pushed while the check button 541 is check-marked, the terminal browser unit 51 causes the collaboration apparatus selection screen to be displayed on the administrator terminal 50 in conformity with the definition of the HTML data of the subscription service selection screen 540a.

FIG. 34 is an exemplary display on a collaboration apparatus selection screen 580. Referring to FIG. 34, the collaboration apparatus selection screen 580 includes a collaboration apparatus selection area 581, an OK button 582, and so on.

On the collaboration apparatus selection area 581, apparatus numbers, apparatus names, installation locations and so on are displayed for each of the image forming apparatuses 10 administered by the administrator and check box buttons are arranged. The apparatus information items of the image forming apparatuses 10 administered by the administrator are stored in a record containing the administrator name which is stored in the apparatus information memory unit 28 of the event delivery apparatus 20. Said differently, a display content of the collaboration apparatus selection area 581 is based on the memory content in the apparatus information memory unit 28. The administrator check-marks the check box buttons on the collaboration apparatus selection area 581 to thereby cause the image forming apparatuses 10 corresponding to the check box buttons to be the collaboration object. The administrator may release the check-marks of the check box buttons to thereby omit the corresponding image forming apparatuses 10 from the collaboration object.

The image forming apparatus 10 to be the collaboration object is selected on the collaboration apparatus selection area 581, and the OK button 582 is pushed in step S161. The terminal browser unit 51 sends an add request for the subscription service including a subscription service name selected (check-marked) on the subscription service selection screen 540a and the apparatus numbers of the image forming apparatuses 10 selected (check-marked) on the collaboration apparatus selection screen 580 to the collaboration setup unit 22 in step S162.

The Ok button 542 may be pushed while the check box button 543a is checked on the subscription service selection screen 540a in FIG. 33 in step S161. The terminal browser unit 51 sends an add request for the subscription service including the subscription service names check-marked (selected) in the subscription service selection screen 540a and the apparatus numbers of all the image forming apparatuses 10 administered under the administrator to the collaboration setup unit 22 in step S162. The apparatus numbers of all the image forming apparatuses 10 administered under the administrator are acquired from the apparatus information memory unit 28 at the time of generating the HTML data of the subscription service selection screen 540a and recorded in the HTML data.

The collaboration setup unit 22 receives the add request for the subscription service from the terminal browser unit 51. Then, the user name stored in the memory device 203 in step S128, the subscription service name designated in the add request and one or more apparatus numbers are associated and the associated user name, subscription service name and apparatus numbers are stored (registered) in the collaboration information memory unit 26 in FIG. 32 in step S163. When plural apparatus numbers are designated in the add request of the subscription service, records may be stored for each apparatus number, or the plural apparatus numbers may be stored in one record.

Subsequently, the collaboration setup unit 22 requests the apparatus setup unit 27 to send the request for reporting the event to the image forming apparatus 10 in step S164. The request designates the one or more apparatus numbers designated in the add request for the subscription service as identification information of the image forming apparatuses 10 at a transmission destination of the request for the event report. The event type of the event to be reported such as a fax receipt is designated as a request from the collaboration setup unit 22. The event type is included in the subscription event list stored in the subscription information memory unit 25 (see FIG. 6) in association with the subscription service name designated by the add request of the subscription service.

Subsequently, the apparatus setup unit 27 sends a request to the image forming apparatus 10, for the event report designated in the request from the collaboration setup unit 22 to be sent to the image forming apparatus 10 corresponding to the apparatus number designated in the request form the collaboration setup unit 22 in step S165. The event type designated in the request from the collaboration setup unit 22 is designated in the request for the report. The apparatus setup unit 27 specifies the IP address of the image forming apparatus 10 designated in the request from the collaboration setup unit 22 by referring to the apparatus information memory unit 28 and sends the request for the event report to the IP address. When the IP address of the image forming apparatus 10 is "FW", the request for the event report is not sent. This is because the firewall prevents the request from being sent from the event delivery apparatus to the image forming apparatus 10.

The event reporting unit 122 of the image forming apparatus 10 which receives the request for the event report stores the event type designated in the request for the report in the report object memory unit (FIG. 17) in step S166. The event reporting unit 122 sends a response indicative of registration of an event related to the designated event type as a report object to the apparatus setup unit 27 in step S167. The apparatus setup unit 27 returns a response to the request from the collaboration setup unit 22 to the collaboration setup unit 22 in step S168.

Meanwhile, the apparatus setup unit 27 waits for a receipt of an event report request confirmation from the image forming apparatus 10 of which IP address registered in the apparatus information memory unit 28 is "FW". The event reporting unit 12 of the image forming apparatus 10 of which IP address registered in the apparatus information memory unit 28 is "FW" periodically sends the event report request confirmation to the apparatus setup unit 27, for example. The event report request confirmation is used to inquire whether the request for the event report exists. The apparatus number of the image forming apparatus 10 at a transmission source of the event report request confirmation is designated within the event report request confirmation.

The event report request confirmation is received by the apparatus setup unit 27 in step S171. Then, the apparatus setup unit 27 specifies, with reference to the subscription information memory unit 25, an event type subscribed to by a subscription service corresponding to the subscription service name stored in the collaboration information memory unit 26 which is designated in the event report request confirmation. Subsequently, the apparatus setup unit 27 returns a response including the event type to the image forming apparatus 10 at the transmission source of the event report request confirmation in step S172.

The event reporting unit 122 of the image forming apparatus 10 which receives the response stores the event type included in the response in the report object memory unit 124 (FIG. 17) in step S173. The event reporting unit 122 sends a report indicative of registration of an event related to the designated event type as the report object to the apparatus setup unit 27 in step S174.

Thereafter, the processes on and after step S304 in FIG. 25 are performed in response to an occurrence of the event corresponding to the event type stored in the report object memory unit 124 in S166 and S173.

The event report request confirmation in step S171 may be performed along with step S304 in FIG. 25. Said differently, confirmation whether a request for reporting another event type exists may be requested along with the event report of the event type which has already been requested.

As described, within the embodiment 2, it is possible to simultaneously set the request of the event reports from the plural image forming apparatuses 10 in the administrator terminal 50. Therefore, work burden of the administrator can be diminished. Further, one of the image forming apparatuses 10 may play a role of the administrator terminal 50. In this case, the apparatus browser unit 121 may be used instead of the terminal browser unit 51.

The embodiment 2 may be applied to an electronic apparatus such as a projector, a desktop personal computer (PC), a notebook personal computer, a personal digital assistant (PDA), a tablet-type terminal, a smart phone, a mobile phone, a digital camera or the like, other than the image forming apparatus 10. In this case, an event to be a report object may be determined in conformity with the electronic apparatus.

Further, in the above embodiments 1 and 2, the event delivery apparatus 20 and the service providing apparatus 30 may be integrated into one computer or may be decentralized into plural computers.

Figure 35:
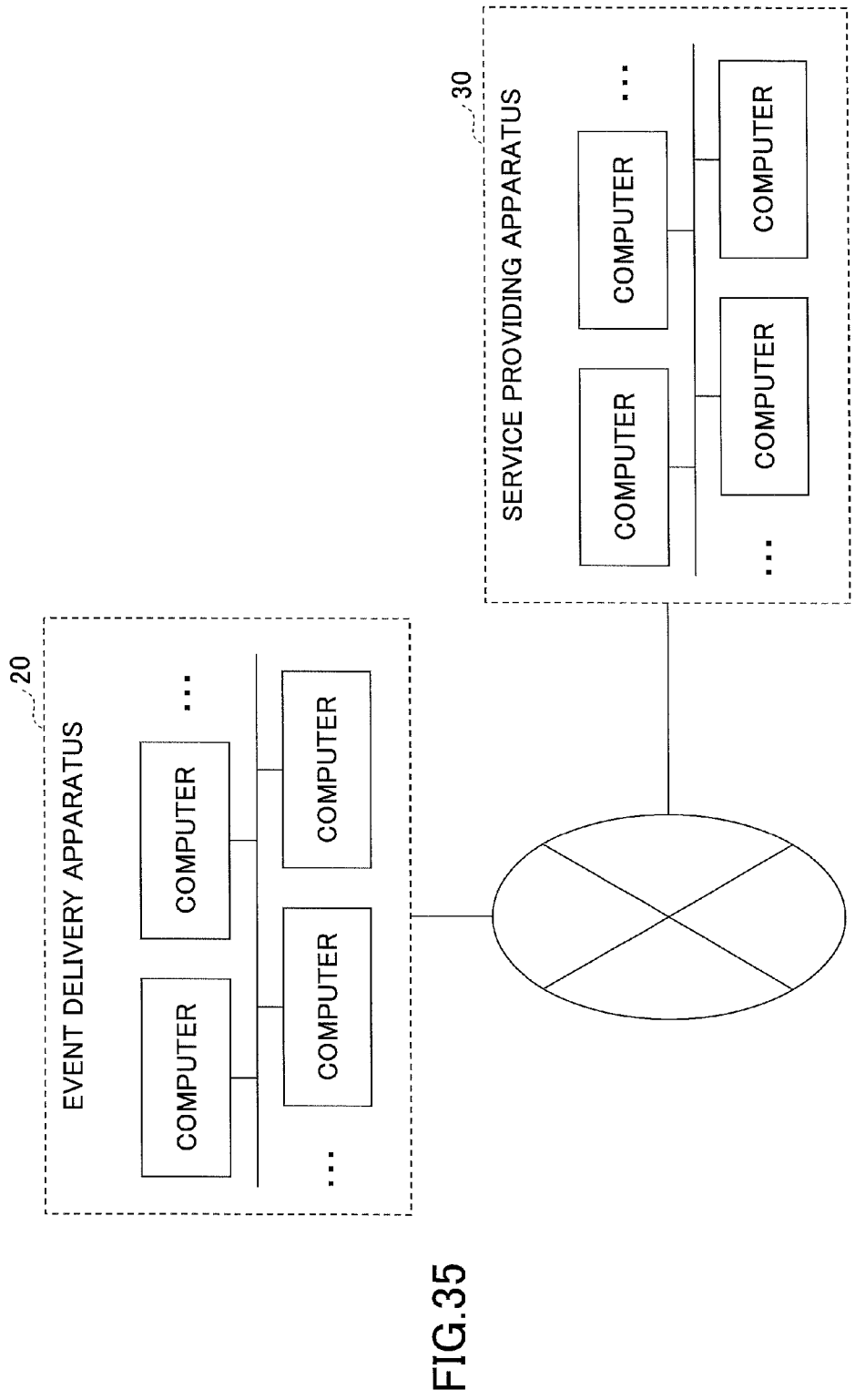
FIG. 35 illustrates an exemplary structure including an event delivery apparatus formed by plural computers and a service providing apparatus formed by plural computers.

FIG. 35 illustrates an exemplary structure including an event delivery apparatus 20 formed of plural computers and a service providing apparatus 30 formed by plural computers. Referring to FIG. 35, function of the event delivery apparatus 20 is decentralized and realized by plural computers and the function of the service providing apparatus 30 is decentralized and realized by plural computers. Referring to FIG. 35, the numbers of computers forming the event delivery apparatus 20 and the service providing apparatus 30 are respectively four or greater. However, the numbers of computers may be less than four.

The apparatus browser unit 121 is an example of the display control unit in the embodiment 2. The event reporting unit 122 is an example of a sending unit. The report object memory unit 124 is an example of a memory unit. The subscription information memory unit 25 is an example of a delivery destination storage unit. The delivery unit 23 is an example of a delivery unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system, the information processing apparatus, and the information processing method have been described in detail, it should be understood that various changes, substitutions, and alterations could be made thereto without departing from the spirit and scope of the invention.

This patent application is based on Japanese Priority Patent Application No. 2011-203790 filed on Sep. 16, 2011 and Japanese Priority Patent Application No. 2012-026875 filed on Feb. 10, 2012, the entire contents of which are hereby incorporated herein by reference.

What is claimed is:

1. An information processing system comprising:
   a first apparatus including
      a service selection screen configured to receive a selection of a service to be used,
      a storage unit configured to store types of events which occur in the first apparatus and are determined to be reported to an information processing apparatus connected to the first apparatus via a network, and
      a sending unit configured to send, when one of the events stored in the storage unit occurs, event information of the one of the events to the information processing apparatus; and
   the information processing apparatus including
      a delivery destination storage unit configured to store the types of events corresponding to the service to be used by a second apparatus, whose selection is received by the service selection screen, and identification information of the second apparatus existing at a delivery destination of the one of the events occurring in the first apparatus while associating the service to be used by the second apparatus with the identification information of the second apparatus, and
      a delivery unit configured to send the event information of the one of the events to the second apparatus of which identification information is stored in the delivery destination storage unit when the event information is received by the information processing apparatus.

2. The information processing system according to claim 1, wherein
   the first apparatus further includes
      a display control unit configured to cause a screen to be displayed on the first apparatus based on display data received by the first apparatus via the network,
   wherein the storage unit included in the first apparatus stores the type of the selected event selected using the screen.

3. The information processing system according to claim 2, wherein the storage unit stores the type of the selected event selected as a result of a process performed by the display control unit based on a script contained in the display data and an input to the screen.

4. The information processing system according to claim 1, wherein
   the delivery unit included in the information processing apparatus sends, when the event information is received from the first apparatus, the event information to the second apparatus existing at the delivery destination associated with the event by the identification information.

5. An information processing apparatus comprising:
   a delivery destination storage unit configured to store a type of an event corresponding to a service to be used, whose selection is received by a service selection screen of a first apparatus, and identification information of a second apparatus exiting at a delivery destination of the event occurring in the first apparatus while associating the service to be used by the second apparatus with the identification information of the second apparatus; and a delivery unit configured to send event information of the event, which occurs in the first apparatus and determined as a report object to be reported to the information processing apparatus, to the second apparatus of which identification information is stored in the delivery destination storage unit when the event information is sent by the first apparatus and received by the information processing apparatus.

6. The information processing apparatus according to claim 5,
wherein the event information of the event, which occurs in the first apparatus, is determined as the report object to be reported to the information processing apparatus by an instruction from an outside via the network.

7. The information processing apparatus according to claim 6,
wherein the instruction from the outside uses a script.

8. The information processing apparatus according to claim 5,
wherein
the delivery unit included in the information processing apparatus sends, when the event information is received from the first apparatus, the event information to the second apparatus existing at the delivery destination associated with the event by the identification information.

9. An information processing method comprising:
storing a type of an event corresponding to a service to be used, whose selection is received by a service selection screen of a first apparatus, and identification information of a second apparatus exiting at a delivery destination of the event occurring in the first apparatus while associating the service to be used by the second apparatus with the identification information of the second apparatus; and sending event information of the event, which occurs in the first apparatus and determined as a report object to be reported to an information processing apparatus, to the second apparatus of which identification information is stored when the event information is sent by the first apparatus and received by the information processing apparatus.

10. The information processing method according to claim 9,
wherein the event information of the event, which occurs in the first apparatus, is determined as the report object to be reported to the information processing apparatus by an instruction from an outside via the network.

11. The information processing method according to claim 10,
wherein the instruction from the outside uses a script.

12. The information processing method according to claim 9,
wherein
the sending event information sends, when the event information is received from the first apparatus, the event information to the second apparatus existing at the delivery destination associated with the event by the identification information.

* * * * *